United States Patent
Nicholas et al.

(10) Patent No.: US 10,333,775 B2
(45) Date of Patent: Jun. 25, 2019

(54) FACILITATING THE PROVISIONING OF A LOCAL ANALYTICS DEVICE

(71) Applicant: Uptake Technologies, Inc., Chicago, IL (US)

(72) Inventors: Brad Nicholas, Wheaton, IL (US); Brett Heliker, Chicago, IL (US)

(73) Assignee: Uptake Technologies, Inc., Chicago, IL (US)

( * ) Notice: Subject to any disclaimer, the term of this patent is extended or adjusted under 35 U.S.C. 154(b) by 194 days.

(21) Appl. No.: 15/370,215

(22) Filed: Dec. 6, 2016

(65) Prior Publication Data

US 2017/0353352 A1   Dec. 7, 2017

Related U.S. Application Data

(60) Provisional application No. 62/345,170, filed on Jun. 3, 2016.

(51) Int. Cl.
| | |
|---|---|
| G07C 5/08 | (2006.01) |
| H04W 4/38 | (2018.01) |
| H04W 4/50 | (2018.01) |
| H04W 4/70 | (2018.01) |
| H04L 12/24 | (2006.01) |
| H04L 29/08 | (2006.01) |

(52) U.S. Cl.
CPC .......... *H04L 41/0803* (2013.01); *H04L 67/34* (2013.01); *H04W 4/50* (2018.02); *G07C 5/0808* (2013.01); *H04L 67/12* (2013.01); *H04W 4/38* (2018.02); *H04W 4/70* (2018.02)

(58) Field of Classification Search
CPC ..... H04L 41/0803; H04L 67/12; H04L 67/34; H04W 4/38; H04W 4/50; H04W 4/70; G07C 5/0808
See application file for complete search history.

(56) References Cited

U.S. PATENT DOCUMENTS

| | | |
|---|---|---|
| 5,566,092 A | 10/1996 | Wang et al. |
| 5,633,800 A | 5/1997 | Bankert et al. |
| 6,256,594 B1 | 7/2001 | Yamamoto et al. |
| 6,336,065 B1 | 1/2002 | Gibson et al. |
| 6,442,542 B1 | 8/2002 | Ramani et al. |
| 6,473,659 B1 | 10/2002 | Shah et al. |
| 6,622,264 B1 | 9/2003 | Bliley et al. |
| 6,634,000 B1 | 10/2003 | Jammu et al. |
| 6,643,600 B2 | 11/2003 | Yanosik et al. |

(Continued)

FOREIGN PATENT DOCUMENTS

| | | |
|---|---|---|
| WO | 2011117570 | 9/2011 |
| WO | 2012022381 A1 | 2/2012 |

(Continued)

OTHER PUBLICATIONS

Mthinx Integrated Technologies, LLC. "mCLOUD IoT Platform Services." www.mthinx.com/?page_id=10933, last accessed Mar. 26, 2016, 3 pages.

(Continued)

*Primary Examiner* — Davoud A Zand
(74) *Attorney, Agent, or Firm* — Lee Sullivan Shea & Smith LLP

(57) ABSTRACT

Disclosed herein are systems, devices, and methods for provisioning a local analytics device to interact with a remote computing system on behalf of an asset that is coupled to the local analytics device and that is associated with a particular customer account hosted by the remote computing system.

20 Claims, 12 Drawing Sheets

(56) References Cited

U.S. PATENT DOCUMENTS

| | | |
|---|---|---|
| 6,650,949 B1 | 11/2003 | Fera et al. |
| 6,725,398 B1 | 4/2004 | Varma et al. |
| 6,760,631 B1 | 7/2004 | Berkowitz et al. |
| 6,775,641 B2 | 8/2004 | Wegerich et al. |
| 6,799,154 B1 | 9/2004 | Aragones et al. |
| 6,823,253 B2 | 11/2004 | Brunell |
| 6,859,739 B2 | 2/2005 | Wegerich et al. |
| 6,892,163 B1 | 5/2005 | Herzog et al. |
| 6,947,797 B2 | 9/2005 | Dean et al. |
| 6,952,662 B2 | 10/2005 | Wegerich et al. |
| 6,957,172 B2 | 10/2005 | Wegerich |
| 6,975,962 B2 | 12/2005 | Wegerich et al. |
| 7,020,595 B1 | 3/2006 | Adibhatla et al. |
| 7,082,379 B1 | 7/2006 | Bickford et al. |
| 7,100,084 B2 | 8/2006 | Unkle et al. |
| 7,107,491 B2 | 9/2006 | Graichen et al. |
| 7,127,371 B2 | 10/2006 | Duckert et al. |
| 7,233,886 B2 | 6/2007 | Wegerich et al. |
| 7,280,941 B2 | 10/2007 | Bonanni et al. |
| 7,308,385 B2 | 12/2007 | Wegerich et al. |
| 7,366,892 B2 | 4/2008 | Spaur et al. |
| 7,373,283 B2 | 5/2008 | Herzog et al. |
| 7,403,869 B2 | 7/2008 | Wegerich et al. |
| 7,409,320 B2 | 8/2008 | Wegerich |
| 7,415,382 B1 | 8/2008 | Bickford et al. |
| 7,428,478 B2 | 9/2008 | Aragones |
| 7,447,666 B2 | 11/2008 | Wang |
| 7,457,693 B2 | 11/2008 | Olsen et al. |
| 7,457,732 B2 | 11/2008 | Aragones et al. |
| 7,509,235 B2 | 3/2009 | Bonissone et al. |
| 7,536,364 B2 | 5/2009 | Subbu et al. |
| 7,539,597 B2 | 5/2009 | Wegerich et al. |
| 7,548,830 B2 | 6/2009 | Goebel et al. |
| 7,634,384 B2 | 12/2009 | Eryurek et al. |
| 7,640,145 B2 | 12/2009 | Wegerich et al. |
| 7,660,705 B1 | 2/2010 | Meek et al. |
| 7,725,293 B2 | 5/2010 | Bonissone et al. |
| 7,739,096 B2 | 6/2010 | Wegerich et al. |
| 7,756,678 B2 | 7/2010 | Bonissone et al. |
| 7,822,578 B2 | 10/2010 | Kasztenny et al. |
| 7,869,908 B2 | 1/2011 | Walker |
| 7,919,940 B2 | 4/2011 | Miller et al. |
| 7,941,701 B2 | 5/2011 | Wegerich et al. |
| 7,962,240 B2 | 6/2011 | Morrison et al. |
| 8,024,069 B2 | 9/2011 | Miller et al. |
| 8,050,800 B2 | 11/2011 | Miller et al. |
| 8,145,578 B2 | 3/2012 | Pershing et al. |
| 8,229,769 B1 | 7/2012 | Hopkins |
| 8,234,420 B2 | 7/2012 | Lueckenbach et al. |
| 8,239,170 B2 | 8/2012 | Wegerich |
| 8,275,577 B2 | 9/2012 | Herzog |
| 8,285,402 B2 | 10/2012 | Lueckenbach et al. |
| 8,311,774 B2 | 11/2012 | Hines |
| 8,352,216 B2 | 1/2013 | Subbu et al. |
| 8,532,795 B2 | 9/2013 | Adavi et al. |
| 8,533,018 B2 | 9/2013 | Miwa et al. |
| 8,560,494 B1 | 10/2013 | Downing et al. |
| 8,620,618 B2 | 12/2013 | Eryurek et al. |
| 8,620,853 B2 | 12/2013 | Herzog |
| 8,626,385 B2 | 1/2014 | Humphrey |
| 8,645,276 B2 | 2/2014 | Wong et al. |
| 8,660,980 B2 | 2/2014 | Herzog |
| 8,689,108 B1 | 4/2014 | Duffield et al. |
| 8,713,467 B1 | 4/2014 | Goldenberg et al. |
| 8,786,605 B1 | 7/2014 | Curtis et al. |
| 8,799,799 B1 | 8/2014 | Cervelli et al. |
| 8,812,960 B1 | 8/2014 | Sun et al. |
| 8,818,613 B2 | 8/2014 | Becker et al. |
| 8,832,594 B1 | 9/2014 | Thompson et al. |
| 8,850,000 B2 | 9/2014 | Collins et al. |
| 8,862,938 B2 | 10/2014 | Souvannarath |
| 8,868,537 B1 | 10/2014 | Colgrove et al. |
| 8,886,601 B1 | 11/2014 | Landau et al. |
| 8,909,656 B2 | 12/2014 | Kumar et al. |
| 8,917,274 B2 | 12/2014 | Ma et al. |
| 8,918,246 B2 | 12/2014 | Friend |
| 8,924,429 B1 | 12/2014 | Fisher et al. |
| 8,935,201 B1 | 1/2015 | Fisher et al. |
| 8,937,619 B2 | 1/2015 | Sharma et al. |
| 8,938,686 B1 | 1/2015 | Erenrich et al. |
| 10,193,942 B2 * | 1/2019 | Huang ............... H04L 65/4084 |
| 2002/0091972 A1 | 7/2002 | Harris et al. |
| 2002/0152056 A1 | 10/2002 | Herzog et al. |
| 2003/0055666 A1 | 3/2003 | Roddy et al. |
| 2003/0126258 A1 | 7/2003 | Conkright et al. |
| 2004/0181712 A1 | 9/2004 | Taniguchi et al. |
| 2004/0243636 A1 | 12/2004 | Hasiewicz et al. |
| 2005/0027438 A1 | 2/2005 | Rockett et al. |
| 2005/0119905 A1 | 6/2005 | Wong et al. |
| 2005/0222747 A1 | 10/2005 | Vhora et al. |
| 2007/0263628 A1 | 11/2007 | Axelsson et al. |
| 2008/0059080 A1 | 3/2008 | Greiner et al. |
| 2008/0059120 A1 | 3/2008 | Xiao et al. |
| 2008/0141066 A1 | 6/2008 | Wood et al. |
| 2009/0164039 A1 | 6/2009 | Jung et al. |
| 2010/0031046 A1 * | 2/2010 | Heinemann ............. G06F 21/34 |
| | | 713/173 |
| 2010/0107225 A1 * | 4/2010 | Spencer ............. H04L 63/0876 |
| | | 726/4 |
| 2010/0131304 A1 | 5/2010 | Collopy et al. |
| 2010/0191487 A1 * | 7/2010 | Rada ...................... G05F 1/70 |
| | | 702/60 |
| 2011/0251807 A1 * | 10/2011 | Rada ...................... G01D 4/00 |
| | | 702/61 |
| 2012/0271612 A1 | 10/2012 | Barsoum et al. |
| 2012/0310597 A1 | 12/2012 | Uchiyama et al. |
| 2013/0010610 A1 | 1/2013 | Karthikeyan et al. |
| 2013/0024416 A1 | 1/2013 | Herzog |
| 2013/0167196 A1 * | 6/2013 | Spencer .................. H04W 8/22 |
| | | 726/3 |
| 2013/0283773 A1 | 10/2013 | Hague |
| 2013/0325502 A1 | 12/2013 | Robicsek et al. |
| 2014/0012886 A1 | 1/2014 | Downing et al. |
| 2014/0032132 A1 | 1/2014 | Stratton et al. |
| 2014/0060030 A1 | 3/2014 | Ma et al. |
| 2014/0089035 A1 | 3/2014 | Jericho et al. |
| 2014/0105481 A1 | 4/2014 | Hasselbusch et al. |
| 2014/0121868 A1 | 5/2014 | Zhang et al. |
| 2014/0169398 A1 | 6/2014 | Arndt et al. |
| 2014/0170617 A1 | 6/2014 | Johnson et al. |
| 2014/0184643 A1 | 7/2014 | Friend |
| 2014/0201526 A1 * | 7/2014 | Burgess ............... G06F 21/316 |
| | | 713/165 |
| 2014/0222355 A1 | 8/2014 | Cheim et al. |
| 2014/0241373 A1 | 8/2014 | Pasam et al. |
| 2014/0330600 A1 | 11/2014 | Candas et al. |
| 2014/0330749 A1 | 11/2014 | Candas et al. |
| 2014/0351642 A1 | 11/2014 | Bates et al. |
| 2014/0357295 A1 | 12/2014 | Skomra et al. |
| 2014/0358601 A1 | 12/2014 | Smiley et al. |
| 2015/0046870 A1 | 2/2015 | Goldenberg et al. |
| 2015/0262060 A1 | 9/2015 | Husain et al. |
| 2015/0347763 A1 | 12/2015 | Roth et al. |
| 2016/0012465 A1 * | 1/2016 | Sharp ..................... G06Q 20/18 |
| | | 705/14.17 |
| 2016/0155098 A1 | 6/2016 | McElhinney |
| 2017/0118264 A1 * | 4/2017 | Huang ............... H04L 65/4084 |
| 2017/0200324 A1 | 7/2017 | Chennakeshu |
| 2018/0279119 A1 | 9/2018 | Eftimovski et al. |

FOREIGN PATENT DOCUMENTS

| | | |
|---|---|---|
| WO | 2013034420 | 3/2013 |
| WO | 2014145977 | 9/2014 |
| WO | 2014205497 | 12/2014 |

OTHER PUBLICATIONS gov.uk. "Telefonica 02 Smart Tracking (Vehicle Telematics)." www.digitalmarketplace.service.gov.uk/g-cloud/services/7625773378406116#content, last accessed Mar. 26, 2016, 5 pages.

(56) References Cited

OTHER PUBLICATIONS

Telefonica UK Limited. "Telefonica 02 Smart Tracking Service Definition." Published 2015, 3 pages.
Mobilizz. "Telematics Consulting & Data Analytics." mobilizz.com/services/telematics-consulting-data-analysis/, Dec. 27, 2015 (accessed via Wayback Machine at http://web.archive.org/web/20151227034721/http://mobilizz.com/services/telematics-consulting-data-analysis/), 4 pages.
Mobilizz. "Telematics Installation/Implementation." mobilizz.com/services/telematics-implementation/, last accessed Mar. 26, 2016, 8 pages.
Manyika et al. "The Internet of Things: Mapping the Value Beyond the Hype." McKinsey Global Institute, Jun. 2015, 144 pages.
Allstate. "What is a Telematics Device?" www.allstate.com/404sitemap.aspx, Published Jan. 2014, 3 pages.
Biswas, "Redundancy-based Approaches in Wireless Multihop Network Design", PhD Dissertation Submitted to Graduate Faculty of North Carolina State University (2014).
Isermann, "Model-based Fault Detection and Diagnosis—Status and Applications", Institute of Automatic Control, Darmstadt University of Technology (2004).
Narasimhan et al, "Combining Model-Based and Feature-Driven Diagnosis Approaches—A Case Study on Electromechanical Actuators", 21st International Workshop on Principles of Diagnosis (2010).
Prentzas et al, Categorizing Approaches Combining Rule-Based and Case-Based Reasoning.
Infor M3 Enterprise Management System, Infor.com (2014).
Infor Equipment, Infor.com (2012).
Infor Introduces Next-Generation Solution for Equipment Dealers and Service Providers, Infor.com (Feb. 20, 2014).
Infor Equipment for Rental, Infor.com (2013).
Waltermire et al, Applying the Continuous Monitoring Technical Reference Model to the Asset, Configuration, and Vulnerability Management Domains (DRAFT), NIST (Jan 2012).
International Searching Authority, International Search Report and Written Opinion dated Sep. 12, 2017, issued in connection with International Application No. PCT/US2017/035562, filed Jun. 2, 2017, 12 pages.

* cited by examiner

FACILITATING THE PROVISIONING OF A LOCAL ANALYTICS DEVICE

CROSS-REFERENCE TO RELATED APPLICATIONS

This application claims the benefit of U.S. Provisional Patent App. No. 62/345,170, filed on Jun. 3, 2016 and entitled Provisioning a Local Analytics Device, which is incorporated by reference in its entirety. This application also incorporates by reference each of the following patent applications in their entirety: U.S. Non-Provisional patent application Ser. No. 14/732,258, filed on Jun. 5, 2015 and entitled Asset Health Score; U.S. Non-Provisional patent application Ser. No. 14/744,352, filed on Jun. 19, 2015 and entitled Aggregate Predictive Model & Workflow for Local Execution; U.S. Non-Provisional patent application Ser. No. 14/963,207, filed on Dec. 8, 2015 and entitled Local Analytics at an Asset; U.S. Non-Provisional patent application Ser. No. 15/370,225, filed on Dec. 6, 2016 and entitled Provisioning a Local Analytics Device.

BACKGROUND

Machines (referred to herein as "assets") and processing operations are essential elements of value creation in many industries. From locomotives that transfer cargo across countries to assembly lines that transform components into products and medical equipment that helps nurses and doctors to save lives, assets are foundational elements of economic activity. Asset cost and complexity can vary greatly depending on its intended use. For instance, some assets may include multiple subsystems that must operate in harmony for the asset to function properly (e.g., an engine, transmission, etc. of a locomotive).

Because of the key role that assets play as essential factors of production, it is frequently desirable to minimize the time that they are unavailable. Accordingly, some have developed mechanisms to monitor and detect abnormal conditions within an asset to facilitate repairing the asset, perhaps with minimal downtime.

OVERVIEW

Disclosed herein are systems, devices, and methods for provisioning a local analytics device coupled to an asset to thereby allow the local analytics device to interact with a remote computing system on behalf of the asset and a customer account that the asset is associated with.

"Internet of Things" (IoT) technology has become widespread in everyday life, but in integrating such technology with everyday life, various problems have arisen. For example, an IoT device that is retrofitted to an existing device is faced with the challenges of recognizing that existing device, obtaining the required authorizations to act on behalf of that device, and/or routing data on behalf of that device to a proper recipient, among numerous other challenges.

These, and other challenges, are especially prevalent in the IoT context of remote asset monitoring and management. For instance, in an asset condition-monitoring environment, an IoT device taking the form of a local analytics device collects a vast amount of data directly from or on behalf of a given asset, which is then typically processed by that device and subsequently routed to a remote asset-monitoring system. Provisioning such a local analytics device so that it is authorized to interact with the remote asset-monitoring system on behalf of the given asset presents a number of challenges including authorization as mentioned above, authentication, privacy and security, among other challenges. The abundant amount of asset data and number of assets with IoT-equipped analytics devices necessitates effective techniques for provisioning analytics devices to operate within an asset condition-monitoring environment.

The example systems, devices, and methods disclosed herein seek to help address one or more of these issues. In accordance with example embodiments, a local analytics device coupled to an asset, a provisioning device communicatively coupled to the local analytics device, and an asset data platform may each perform one or more operations to help provision the local analytics device to interact with the asset data platform on behalf of the asset and a customer account hosted by the asset data platform that the asset is associated with. Distributing provisioning operations to multiple entities may help ensure that the local analytics device is operating on behalf of the asset in an authorized manner. As such, the various entities help to perform a multi-phase authorization process prior to the local analytics device operating on behalf of the asset.

The provisioning operations described herein generally involve the exchange of credentials, where a particular credential enables a particular device to perform a particular, limited operation related to a particular asset. As such, a given credential may be role-specific and/or asset-specific. In some cases, a first, particular credential is required before a device can continue with provisioning operations described herein, such as exchanging with another device a second, particular credential. Specific credentials are discussed in further detail below, but generally, the operations described herein may involve asset-management credentials that may include or take the form of provisioning credentials or data-management credentials, among other credential types. In turn, data-management credentials may include specific, asset data-related credentials, such as analytics and/or data transfer credentials, among other examples.

The process of provisioning a local analytics device to operate in an asset condition-monitoring environment may begin by a user (e.g., asset operator, technician, etc.) physically coupling the local analytics device to an asset. In example implementations, the local analytics device may be coupled to the asset in a relatively simple manner without requiring expert knowledge or physical modification of the asset. In one particular example, the local analytics device may be physically coupled to the asset via an asset interface, such as an On-Board Diagnostics ("OBD") port or the like, thereby allowing the local analytics device to communicate with one or more of the asset's on-board computerized control systems. Various other asset interface types and possibilities of coupling a local analytics device to an asset are also possible.

Before, after, or perhaps even simultaneously with the operation of physically coupling the local analytics device to the asset, a provisioning device may perform one or more provisioning operations as well. In general, the provisioning device may be a mobile computing device (e.g., smartphone, laptop, tablet, etc.) that runs a provisioning software application (e.g., a native or web application) that may or may not interact with other external systems and facilitates provisioning a local analytics device.

As a preliminary step, the provisioning device and asset data platform may exchange data that results in one or more account credentials (e.g., usernames and corresponding passwords or other types of secure account credentials, such as security tokens) that are associated with a customer account hosted by the asset data platform and that provide access to the customer account. More specifically, the provisioning application running on the provisioning device may facilitate creating and/or associating existing customer accounts hosted by the asset data platform, creating and/or associating existing account credentials for a given customer account, authenticating inputted or otherwise exchanged account credentials (e.g., as a result of a log-in event or passing of a secure token), and/or accessing an existing customer account and information related thereto.

In turn, the asset data platform may store one or more customer accounts that may include or otherwise be linked to databases that may include information associated with each customer account. Examples of such information may include account credentials, asset-role identifiers, asset-management credentials, asset-management permissions, data-management credentials, data-management permissions, asset identifiers, asset status information (e.g., registered or unregistered), and/or asset-related data posted by provisioned local analytics devices or other internal or external data sources. A customer account may include other information and/or may be stored by other computing systems independent of the asset data platform.

In any event, after a customer account is established and account credentials are defined, the provisioning device may receive an account credential based on user inputs (e.g., via a user "log-in" event where the user inputs a username and password combination) and then transmit the received account credential to the asset data platform, which in turn may or may not authenticate the credential and either provide or deny access to the customer account.

For example, the asset data platform will determine whether the account credential that it receives authorizes the provisioning device to access a particular customer account. If so, the asset data platform may then confirm whether provisioning permissions are associated with that account credential, and based on such a confirmation, identify one or more asset-management credentials associated with such particular provisioning permissions. The asset data platform may then transmit (preferably with some level of security) to the provisioning device one or more asset identifiers corresponding to registered and/or unregistered assets associated with the customer account, along with one or more asset-management credentials conferring one or more provisioning and/or data-management permissions intended for the devices that will perform the roles related to such permissions. The provisioning device may then utilize this information to further interact with the asset data platform and facilitate provisioning the local analytics device.

Meanwhile, once the local analytics device is physically coupled to the asset, it may be configured to detect a change in physical state of the asset, such as a transition to a "power-on" state, a physical movement, or a change in an operating state, among other examples. After the local analytics device detects the change in physical state, it may proceed to perform various operations for the purposes of enabling it to operate within an asset condition-monitoring environment on behalf of the asset.

In example embodiments, such operations may involve the local analytics device performing asset discovery operations to determine the identity of the asset that the local analytics device is currently physically coupled to. In general, the asset discovery operations involve the local analytics device determining an "asset signature" for the asset to which it is coupled, where the asset signature is indicative of the configuration of the asset (e.g., the subsystems, components, software versions, etc. that are part of the asset).

In practice, the local analytics device may determine an asset signature in a variety of manners. Generally, the local analytics device determines an asset signature based on obtaining a plurality of data that is each indicative of a configuration parameter of the asset, which the local analytics device then utilizes to define the asset signature. Specific examples of how the local analytics device determines an asset signature are described in detail below, but such examples may generally involve the local analytics device analyzing asset data, either actively or passively, that is generated by the computer systems of the asset and/or performing a model-based asset identification process, among other examples.

Preferably, the determined asset signature may be globally unique for the particular asset that the local analytics device is attached to, such that the local analytics device can distinguish between the particular asset and all other assets (e.g., across all customer accounts). However, such precision may not always be possible. Instead, the determined asset signature may be customer unique, such that the local analytics device can distinguish between the particular asset and any other asset that is also associated with a given customer account. To that end, the asset identification information may directly, or with additional analysis, identify at least the type of the asset (e.g., a bulldozer or excavator) or perhaps additional aspects of the configuration of the asset (e.g., the make, model, year of the asset, and/or the types of components and/or systems installed thereon). Other levels of precision for the asset signature are also possible.

At any point before, after, or while identifying the asset, the local analytics device may send or receive a request to establish a communication link with a provisioning device. In practice, a provisioning device may seek to establish a communication link with the local analytics device in a variety of manners. In one particular example, this operation may involve establishing an ad-hoc network (e.g., a Bluetooth, mesh, USB, or other local wireless or wired network), which may involve the devices exchanging messages according to one or more protocols. The communication link may be established in other manners as well.

In any event, after a connection is established between the local analytics device and the provisioning device, the local analytics device may provide the asset signature to the provisioning device. Based on the asset signature and the one or more asset identifiers provided by the asset data platform, the provisioning device may confirm that the asset signature corresponds to a particular asset associated with the particular customer account and confirm that the one or more asset-management credentials that it received from the asset data platform provide the provisioning device provisioning permissions with respect to the asset that the local analytics device is attached.

If both of these confirmation steps are affirmative, the provisioning device may transmit one or more data-management credentials to the local analytics device that in turn serves to authorize the local analytics device to execute various operations on behalf of the connected asset according to any analytics and/or data transfer permissions associated with such credentials, such as ingesting data from the asset it is coupled to, executing particular asset-related models, and/or transmitting or receiving data to and from the asset data platform. Based on those permissions, the local analytics device may then perform one or more operations on behalf of the connected asset, provided that the local analytics device is authorized to do so.

In instances where the asset signature cannot be confirmed, the provisioning device may either terminate the provisioning attempt or revert to a manual asset-identification operation (e.g., involving user inputs at the provisioning device). In example embodiments, the local analytics device and/or provisioning device may utilize manually entered asset information that is matched with the asset signature that is gathered by the local analytics device to automatically identify the asset in the future. This information may be provided to the asset data platform that maintains a "master database" of asset signatures and corresponding asset identifiers.

As discussed above, the provisioning device may transmit one or more data-management credentials to the local analytics device as a result of an authorized "log-in" attempt. However, in certain situations, the provisioning device may have previously obtained (e.g., via a prior provisioning authentication session) an asset-management credential, and perhaps one or more account-specific asset identifiers, and stored that information. In example embodiments, the provisioning device may automatically execute an authentication session with the local analytics device after a connection is established with the local analytics device where the provisioning device exchanges a data-management credential that is based on the existence of a valid, stored asset-management credential. In some cases, the authentication session may involve the provisioning device utilizing data that is algorithmically related to any stored asset-management credentials to identify the data-management credential that is exchanged (e.g., the most recently stored information if it has stored multiple instances of such information).

In any event, as noted above, the local analytics device may then utilize the data-management credential to interact with the asset data platform on behalf of the asset via a network that may be different from the communication link established with the provisioning device, thereby concluding the provisioning process and registering the asset with the particular customer account.

After the local analytics device is provisioned, it may then interact with the asset and/or the asset data platform on behalf of the asset in accordance with the data-management permissions corresponding to the data-management credential. In example embodiments, the local analytics device may be allowed to ingest data from the asset, locally execute particular predictive models for the asset, publish data to the asset data platform on behalf of the asset (e.g., so that the asset data platform can execute, define, and/or modify a predictive model related to the operation of the asset), download from the asset data platform particular predictive models to be locally executed by the local analytics device for the asset, and/or instruct the asset data platform to perform particular data services for the asset, among various other example operations.

Thus, the multi-actor and multi-phase provisioning process described above helps to securely manage authorizations within an asset condition-monitoring environment in a distributed manner. Moreover, this provisioning process limits the scope of operations that a given device or system can perform on behalf of a customer account, which may help protect the integrity of the customer account if a given credential is comprised. In this way, the provisioning process described herein helps to address several of the problems described above that arise from an IoT technological environment.

While the foregoing discussion assumed that communication paths existed between the local analytics and provisioning devices with the asset data platform, the local analytics device may still be provisioned in cases where such paths do not exist. In some embodiments, the local analytics device may be provisioned so long as the local analytics device and provisioning device are able to establish a communication link between one another.

In one example scenario where only the provisioning device is able to communicate with the asset data platform, some of the above-discussed provisioning operations may nonetheless still be performed. For instance, the provisioning device may still be utilized to facilitate authenticating account credentials and then provide the local analytics device a data-management credential. The local analytics device may still determine an asset signature and also store asset-related data during asset operation and then publish that data to the asset data platform upon detecting a network connection between it and the asset data platform at a time in the future.

In another example scenario where only the local analytics device is able to communicate with the asset data platform, some of the above-discussed provisioning operations may nonetheless still be performed. For instance, the local analytics device may exchange the asset signature and the provisioning device may transmit a data-management credential previously received or otherwise derived by the provisioning device and stored thereon. The local analytics device may in turn begin interacting with the asset data platform on behalf of the asset based on the received data-management credential, in line with the above discussion.

In yet another instance, neither the local analytics device nor the provisioning device may be able to communicate with the asset data platform but some of the above-discussed provisioning operations may nonetheless still be performed. For instance, the local analytics device may exchange the asset signature and the provisioning device may transmit a data-management credential to the local analytics device from a prior provisioning authentication session. The local analytics device may store asset-related data during asset operation and then later publish that data, based on the data-management credential, to the asset data platform upon detecting a network connection between it and the asset data platform at a time in the future. The asset data platform may then retroactively associate the transferred information with the proper customer account based on a parallel communication session between the provisioning device and the asset data platform that results in the asset data platform reconciling the data-management credential identified previously with the proper customer account. Other examples are also possible.

As discussed above, examples provided herein are related to provisioning a local analytics device to act on behalf of an asset. In one aspect, a computing device configured to facilitate provisioning a local analytics device to interact with a remote computing system on behalf of an asset coupled to the local analytics device is provided. The computing device comprises at least one network interface configured to (1) communicatively couple the computing device to the remote computing system via a wide-area network and (2) couple the computing device to the local analytics device, at least one processor, a non-transitory computer-readable medium, and program instructions stored on the non-transitory computer-readable medium that are executable by the at least one processor to cause the computing device to: (a) in response to transmitting an account credential to the remote computing system, receive from the remote computing system an asset-management credential and one or more asset identifiers, wherein each asset identifier corresponds to a given asset associated with a customer account, (b) receive from the local analytics device an asset signature, wherein the asset signature is indicative of a configuration of the asset, (c) based on the one or more asset identifiers and the asset signature, determine that the asset is associated with the customer account, (d) determine that a provisioning permission is associated with the asset-management credential, and (e) based on (1) determining that the asset is associated with the customer account and (2) determining that the provisioning permission is associated with the asset-management credential, transmit to the local analytics device a data-management credential for enabling the local analytics device to perform one or more operations on behalf of the asset.

In another aspect, a non-transitory computer-readable medium is provided having instructions stored thereon that are executable to cause a computing device configured to facilitate provisioning a local analytics device to interact with a remote computing system on behalf of an asset coupled to the local analytics device to: (a) in response to transmitting an account credential to the remote computing system, via a network interface of the computing device, receive from the remote computing system, via a wide-area network, an asset-management credential and one or more asset identifiers, wherein each asset identifier corresponds to a given asset associated with a customer account, (b) receive from the local analytics device, via a network other than the wide-area network, an asset signature, wherein the asset signature is indicative of a configuration of the asset, (c) based on the one or more asset identifiers and the asset signature, determine that the asset is associated with the customer account, (d) determine that a provisioning permission is associated with the asset-management credential, and (e) based on (1) determining that the asset is associated with the customer account and (2) determining that the provisioning permission is associated with the asset-management credential, transmit to the local analytics device a data-management credential for enabling the local analytics device to perform one or more operations on behalf of the asset.

In yet another aspect, asset-condition monitoring system is provided comprising a remote computing system configured to remotely monitor operating conditions of at least one asset and a computing device communicatively coupled to the remote computing system via a wide-area network, wherein the computing is device configured to facilitate provisioning a local analytics device to interact with the remote computing system on behalf of the at least one asset that is coupled to the local analytics device. The remote computing system is configured to: (a) maintain a plurality of asset-management credentials and a plurality of asset identifiers, wherein each asset identifier corresponds to a given asset associated with a customer account, (b) based on an account credential, transmit to the computing device an asset-management credential and one or more asset identifiers, and (c) perform an operation for the at least one asset in response to receiving a data-management credential from the local analytics device. The computing device is configured to: (a) receive from the local analytics device an asset signature, wherein the asset signature is indicative of a configuration of the at least one asset, (b) based on the one or more asset identifiers and the asset signature, determine that the at least one asset is associated with the customer account, and (c) based on (1) determining that the asset is associated with the customer account and (2) determining that a provisioning permission is associated with the asset-management credential, transmit to the local analytics device a data-management credential for enabling the local analytics device to perform one or more operations on behalf of the asset.

One of ordinary skill in the art will appreciate these as well as numerous other aspects in reading the following disclosure.

DETAILED DESCRIPTION

The following disclosure makes reference to the accompanying figures and several exemplary scenarios. One of ordinary skill in the art will understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Example Network Configuration

Figure 1:
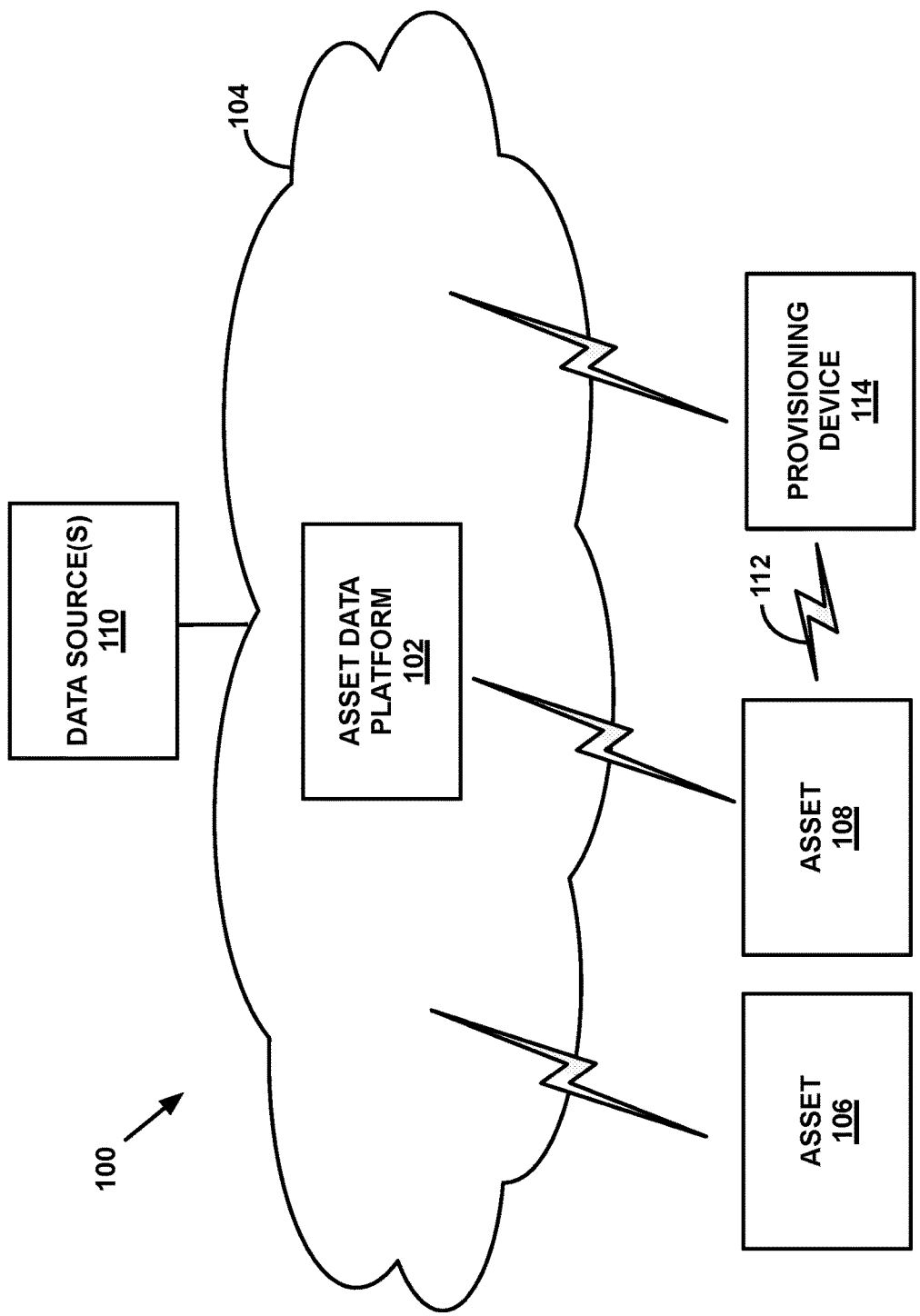
FIG. 1 depicts an example network configuration in which example embodiments may be implemented.

Turning now to the figures, FIG. 1 depicts an example network configuration 100 in which example embodiments may be implemented. As shown, the network configuration 100 includes at its core a remote computing system 102 that may be configured as an asset data platform, which may communicate via a communication network 104 with one or more assets, such as representative assets 106 and 108, one or more data sources, such as representative data source 110, and one or more mobile computing devices, such as representative provisioning device 114 (e.g., a mobile computing device that includes an installed provisioning application, which is discussed in detail below). It should be understood that the network configuration may include various other components as well.

Broadly speaking, the asset data platform 102 (sometimes referred to herein as an "asset condition monitoring system") may take the form of one or more computer systems that are configured to receive, ingest, process, analyze, and/or provide access to asset-related data. For instance, a platform may include one or more servers (or the like) having hardware components and software components that are configured to carry out one or more of the functions disclosed herein for receiving, ingesting, processing, analyzing, and/or providing access to asset-related data. Additionally, a platform may include one or more user interface components that enable a platform user to interface with the platform. In practice, these computing systems may be located in a single physical location or distributed amongst a plurality of locations and may be communicatively linked via a system bus, a communication network (e.g., a private network), or some other connection mechanism. Further, the platform may be arranged to receive and transmit data according to dataflow technology, such as TPL Dataflow or NiFi, among other examples. The platform may take other forms as well. The asset data platform 102 is discussed in further detail below with reference to FIG. 4.

As shown in FIG. 1, the asset data platform 102 may be configured to communicate, via the communication network 104, with the one or more assets 106, 108, data sources 110, and/or mobile computing devices 114 (or other output devices/systems) in the network configuration 100. For example, the asset data platform 102 may receive asset-related data, via the communication network 104, that is sent by one or more assets, data sources, and/or mobile computing devices. As another example, the asset data platform 102 may transmit asset-related data and/or commands, via the communication network 104, for receipt by an output system (e.g., a client station, a work-order system, a parts-ordering system, etc.), and/or mobile computing device. Additionally, the asset data platform 102 may be configured to receive, via the communication network 104, customer account-related data (e.g., account credentials, data-management credentials, account registration information, etc.) from mobile computing devices and/or local analytics devices and transmit customer account-related data (e.g., asset-management credentials, access permissions, account details, etc.) to mobile computing devices and/or local analytics devices. The asset data platform 102 may engage in other types of communication via the communication network 104 as well.

In general, the communication network 104 may include one or more computing systems and network infrastructure configured to facilitate transferring data between asset data platform 102 and the one or more assets, data sources, mobile computing devices, and/or output systems in the network configuration 100. The communication network 104 may be or may include one or more Wide-Area Networks (WANs) and/or Local-Area Networks (LANs), which may be wired and/or wireless and may support secure communication. In some examples, the communication network 104 may include one or more cellular networks and/or the Internet, among other networks. The communication network 104 may operate according to one or more communication protocols, such as LTE, CDMA, GSM, LPWAN, WiFi, Bluetooth, Ethernet, HTTP/S, TCP, CoAP/DTLS and the like. Although the communication network 104 is shown as a single network, it should be understood that the communication network 104 may include multiple, distinct networks that are themselves communicatively linked. Further, in example cases, the communication network 104 may facilitate secure communications between network components (e.g., via encryption or other security measures). The communication network 104 could take other forms as well.

Further, although not shown, the communication path between the asset data platform 102 and the one or more assets, data sources, mobile computing devices, and/or output systems may include one or more intermediate systems. For example, the one or more assets and/or data sources may send asset-related data to one or more intermediary systems, such as an asset gateway or an organization's existing platform (not shown), and the asset data platform 102 may then be configured to receive the asset-related data from the one or more intermediary systems. As another example, the one or more assets may send asset-related data to one or more mobile computing devices, such as representative provisioning device 114, and the asset data platform 102 may then be configured to receive the asset-related data from the mobile computing device. Further still, the asset data platform 102 may communicate with an output system via one or more intermediary systems, such as a host server or gateway (not shown). Many other configurations are also possible.

In general, the assets 106 and 108 may take the form of any machine configured to perform one or more operations (which may be defined based on the field) and may also include equipment configured to transmit data indicative of the operation of the given asset (i.e., operating conditions) and/or receive data from other systems. The transmitted data may take various forms, examples of which may include operating data, such as sensor/actuator data (e.g., signal data) and/or abnormal-condition indicators (e.g., fault codes), identifying data for the asset, location data for the asset, etc. The received data may take various forms, examples of which may include configuration information, commands, program updates, job instructions and other information useful to monitor, coordinate and/or manage the asset and its operation. Various other examples of transmitted and received data are also possible, some of which are discussed below.

Representative examples of asset types may include transportation machines (e.g., locomotives, aircrafts, passenger vehicles, semi-trailer trucks, ships, etc.), industrial machines (e.g., mining equipment, construction equipment, processing equipment, assembly equipment, etc.), medical machines (e.g., medical imaging equipment, surgical equipment, medical monitoring systems, medical laboratory equipment, etc.), utility machines (e.g., turbines, solar farms, etc.), and unmanned aerial vehicles, among other examples. Additionally, the assets of each given type may have various different classes (e.g., brand, make, model) and/or the assets may vary in configuration in other manners (e.g., firmware version, type of components installed on the given asset, operating history including cumulative usage information, among others, and combinations of uniquely identifying information for that asset, etc.) and/or may be associated with different combinations of information that may be used to uniquely identify the given asset.

As such, in some examples, the assets 106 and 108 may each be of the same type (e.g., a fleet of locomotives or aircrafts, a group of wind turbines, a pool of milling machines, or a set of magnetic resonance imagining (MM) machines, among other examples) and perhaps may be of the same class (e.g., the same brand, make, model, etc.), yet potentially differ in some ways with respect to their individual configuration. In other examples, the assets 106 and 108 may have different asset types or classes. For instance, assets 106 and 108 may be different pieces of equipment at a job site (e.g., an excavation site) or a production facility, among numerous other examples. Those of ordinary skill in the art will appreciate that these are but a few examples of assets and that numerous others are possible and contemplated herein.

Depending on an asset's configuration, the asset may also include one or more subsystems configured to perform one or more respective operations. For example, in the context of transportation assets, subsystems may include engines, transmissions, drivetrains, fuel systems, battery systems, exhaust systems, braking systems, electrical systems, signal processing systems, generators, gear boxes, rotors, and hydraulic systems, among numerous other examples. In practice, an asset's multiple subsystems may operate in parallel or sequentially in order for an asset to operate. Representative assets are discussed in further detail below with reference to FIG. 2.

In general, the data source 110 may be or include one or more computing systems configured to collect, store, and/or provide data that is related to the assets or is otherwise relevant to the functions performed by the asset data platform 102. For example, the data source 110 may collect and provide operating data that originates from the assets (e.g., historical operating data), in which case the data source 110 may serve as an alternative source for such asset operating data. As another example, the data source 110 may be configured to provide data that does not originate from the assets, which may be referred to herein as "external data." Such a data source may take various forms.

In one implementation, the data source 110 could take the form of an environment data source that is configured to provide data indicating some characteristic of the environment in which assets are operated. Examples of environment data sources include weather-data servers, global navigation satellite systems (GNSS) servers, map-data servers, and topography-data servers that provide information regarding natural and artificial features of a given area, among other examples.

In another implementation, the data source 110 could take the form of asset-management data source that provides data indicating events or statuses of entities (e.g., other assets) that may affect the operation or maintenance of assets (e.g., when and where an asset may operate or receive maintenance). Examples of asset-management data sources include asset-maintenance servers that provide information regarding inspections, maintenance, services, and/or repairs that have been performed and/or are scheduled to be performed on assets, traffic-data servers that provide information regarding air, water, and/or ground traffic, asset-schedule servers that provide information regarding expected routes and/or locations of assets on particular dates and/or at particular times, defect detector systems (also known as "hotbox" detectors) that provide information regarding one or more operating conditions of an asset that passes in proximity to the defect detector system, and part-supplier servers that provide information regarding parts that particular suppliers have in stock and prices thereof, among other examples.

The data source 110 may also take other forms, examples of which may include fluid analysis servers that provide information regarding the results of fluid analyses and power-grid servers that provide information regarding electricity consumption, among other examples. One of ordinary skill in the art will appreciate that these are but a few examples of data sources and that numerous others are possible.

In practice, the asset data platform 102 may receive data from the data source 110 by "subscribing" to a service provided by the data source. However, the asset data platform 102 may receive data from the data source 110 in other manners as well.

In example embodiments, the provisioning device 114 may take the form of a mobile (or stationary or embedded) computing device configured to facilitate provisioning a local analytics device (discussed in detail below) to interact with the asset data platform 102 on behalf of an asset (e.g., the asset 108) and customer account associated with that asset. More particularly, the provisioning device 114 may include hardware components such as a user interface, a network interface, a processor, and data storage that may contain software components that enable the device to perform the various functions described herein. In some examples, the provisioning device 114 may run a native software application and/or a web browser capable of accessing a web application provided by the asset data platform 102 that may facilitate communications with the asset data platform 102 and/or assets 106 and 108 via their respective local analytics devices. The provisioning device 114 may be configured to generate credentials based on received credentials via functionality from a particular application (e.g., a provisioning application) or some other secure module that is independent of the particular application. Representative examples of provisioning devices may include a laptop, a netbook, a tablet, a smartphone, a personal digital assistant (PDA), a stationary computer remote or attached to an asset, or any other such device now known or later developed.

It should be understood that network configuration 100 may include various other output systems or devices for facilitating interactions with asset data platform 102, which may take the form of mobile computing devices, desktop, industrial, or embedded computers, among other examples. Examples of output systems may include a work-order system configured to output a request for a mechanic or the like to repair an asset or a parts-ordering system configured to place an order for a part of an asset and output a receipt thereof, among others.

It should be understood that the network configuration 100 is one example of a network in which embodiments described herein may be implemented. Numerous other arrangements are possible and contemplated herein. For instance, other network configurations may include additional components not pictured and/or more or less of the pictured components.

II. Example Asset

Figure 2:
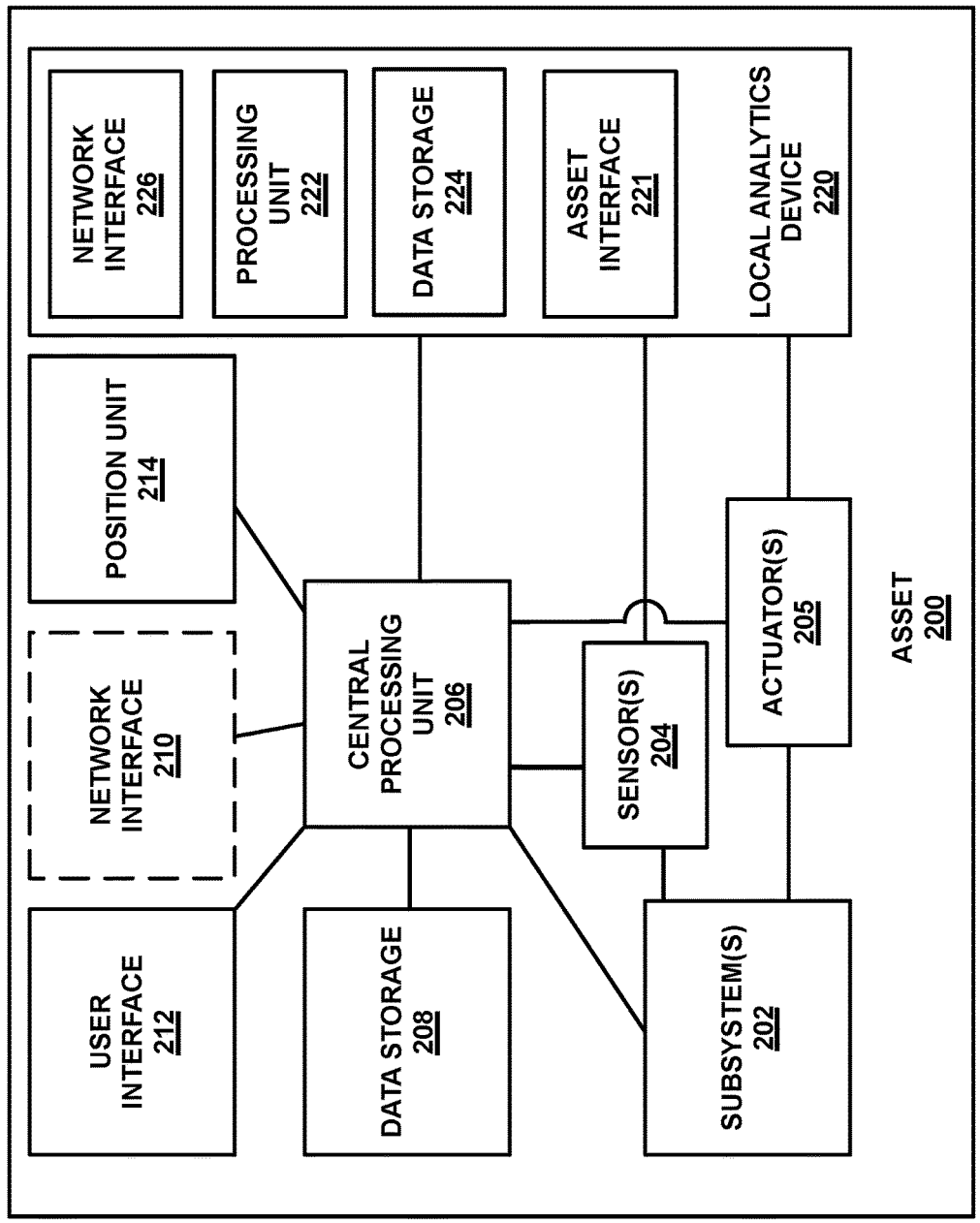
FIG. 2 depicts a simplified block diagram of an example asset.

Turning to FIG. 2, a simplified block diagram of an example asset 200 is depicted. Either or both of assets 106 and 108 from FIG. 1 may be configured like the asset 200. As shown, the asset 200 may include one or more subsystems 202, one or more sensors 204, one or more actuators 205, a central processing unit 206, data storage 208, a network interface 210, a user interface 212, a position unit 214, and also a local analytics device 220, all of which may be communicatively linked (either directly or indirectly) by a system bus, network, or other connection mechanism. One of ordinary skill in the art will appreciate that the asset 200 may include additional components not shown and/or more or less of the depicted components.

Broadly speaking, the asset 200 may include one or more electrical, mechanical, and/or electromechanical components configured to perform one or more operations. In some cases, one or more components may be grouped into a given subsystem 202.

Generally, a subsystem 202 may include a group of related components that are part of the asset 200. A single subsystem 202 may independently perform one or more operations or the single subsystem 202 may operate along with one or more other subsystems to perform one or more operations. Typically, different types of assets, and even different classes of the same type of assets, may include different subsystems. Representative examples of subsystems are discussed above with reference to FIG. 1.

As suggested above, the asset 200 may be outfitted with various sensors 204 that are configured to monitor operating conditions of the asset 200 and various actuators 205 that are configured to interact with the asset 200 or a component thereof and monitor operating conditions of the asset 200. In some cases, some of the sensors 204 and/or actuators 205 may be grouped based on a particular subsystem 202. In this way, the group of sensors 204 and/or actuators 205 may be configured to monitor operating conditions of the particular subsystem 202, and the actuators from that group may be configured to interact with the particular subsystem 202 in some way that may alter the subsystem's behavior based on those operating conditions.

In general, a sensor 204 may be configured to detect a physical property, which may be indicative of one or more operating conditions of the asset 200, and provide an indication, such as an electrical signal, of the detected physical property. In operation, the sensors 204 may be configured to obtain measurements continuously, periodically (e.g., based on a sampling frequency), and/or in response to some triggering event. In some examples, the sensors 204 may be preconfigured with operating parameters for performing measurements and/or may perform measurements in accordance with operating parameters provided by the central processing unit 206 (e.g., sampling signals that instruct the sensors 204 to obtain measurements). In examples, different sensors 204 may have different operating parameters (e.g., some sensors may sample based on a first frequency, while other sensors sample based on a second, different frequency). In any event, the sensors 204 may be configured to transmit electrical signals indicative of a measured physical property to the central processing unit 206. The sensors 204 may continuously or periodically provide such signals to the central processing unit 206.

For instance, sensors 204 may be configured to measure physical properties such as the location and/or movement of the asset 200, in which case the sensors may take the form of GNSS sensors, dead-reckoning-based sensors, accelerometers, gyroscopes, pedometers, magnetometers, or the like. In example embodiments, one or more such sensors may be integrated with or located separate from the position unit 214, discussed below.

Additionally, various sensors 204 may be configured to measure other operating conditions of the asset 200, examples of which may include temperatures, pressures, speeds, acceleration or deceleration rates, friction, power usages, fuel usages, fluid levels, runtimes, voltages and currents, magnetic fields, electric fields, presence or absence of objects, positions of components, and power generation, among other examples. One of ordinary skill in the art will appreciate that these are but a few example operating conditions that sensors may be configured to measure. Additional or fewer sensors may be used depending on the industrial application or specific asset.

As suggested above, an actuator 205 may be configured similar in some respects to a sensor 204. Specifically, an actuator 205 may be configured to detect a physical property indicative of an operating condition of the asset 200 and provide an indication thereof in a manner similar to the sensor 204.

Moreover, an actuator 205 may be configured to interact with the asset 200, one or more subsystems 202, and/or some component thereof. As such, an actuator 205 may include a motor or the like that is configured to perform a mechanical operation (e.g., move) or otherwise control a component, subsystem, or system. In a particular example, an actuator may be configured to measure a fuel flow and alter the fuel flow (e.g., restrict the fuel flow), or an actuator may be configured to measure a hydraulic pressure and alter the hydraulic pressure (e.g., increase or decrease the hydraulic pressure). Numerous other example interactions of an actuator are also possible and contemplated herein.

Generally, the central processing unit 206 may include one or more processors and/or controllers, which may take the form of a general- or special-purpose processor or controller. In particular, in example implementations, the central processing unit 206 may be or include microprocessors, microcontrollers, SoCs ("system on a chip"), application specific integrated circuits, digital signal processors, and the like. In turn, the data storage 208 may be or include one or more non-transitory computer-readable storage media, such as optical, magnetic, organic, or flash memory, among other examples.

The central processing unit 206 may be configured to store, access, and execute computer-readable program instructions stored in the data storage 208 to perform the operations of an asset described herein. For instance, as suggested above, the central processing unit 206 may be configured to receive respective sensor signals from the sensors 204 and/or actuators 205. The central processing unit 206 may be configured to store sensor and/or actuator data in and later access it from the data storage 208.

The central processing unit 206 may also be configured to determine whether received sensor and/or actuator signals trigger any abnormal-condition indicators, such as fault codes. For instance, the central processing unit 206 may be configured to store in the data storage 208 abnormal-condition rules, each of which include a given abnormal-condition indicator representing a particular abnormal condition and respective triggering criteria that trigger the abnormal-condition indicator. That is, each abnormal-condition indicator corresponds with one or more sensor and/or actuator measurement values that must be satisfied before the abnormal-condition indicator is triggered. In practice, the asset 200 may be pre-programmed with the abnormal-condition rules and/or may receive new abnormal-condition rules or updates to existing rules from a computing system, such as the asset data platform 102.

In any event, the central processing unit 206 may be configured to determine whether received sensor and/or actuator signals trigger any abnormal-condition indicators. That is, the central processing unit 206 may determine whether received sensor and/or actuator signals satisfy any triggering criteria. When such a determination is affirmative, the central processing unit 206 may generate abnormal-condition data and then may also cause the asset's network interface 210 to transmit the abnormal-condition data to the asset data platform 102 and/or cause the asset's user interface 212 to output an indication of the abnormal condition, such as a visual and/or audible alert. Additionally, the central processing unit 206 may log the occurrence of the abnormal-condition indicator being triggered in the data storage 208, perhaps with a timestamp.

Figure 3:
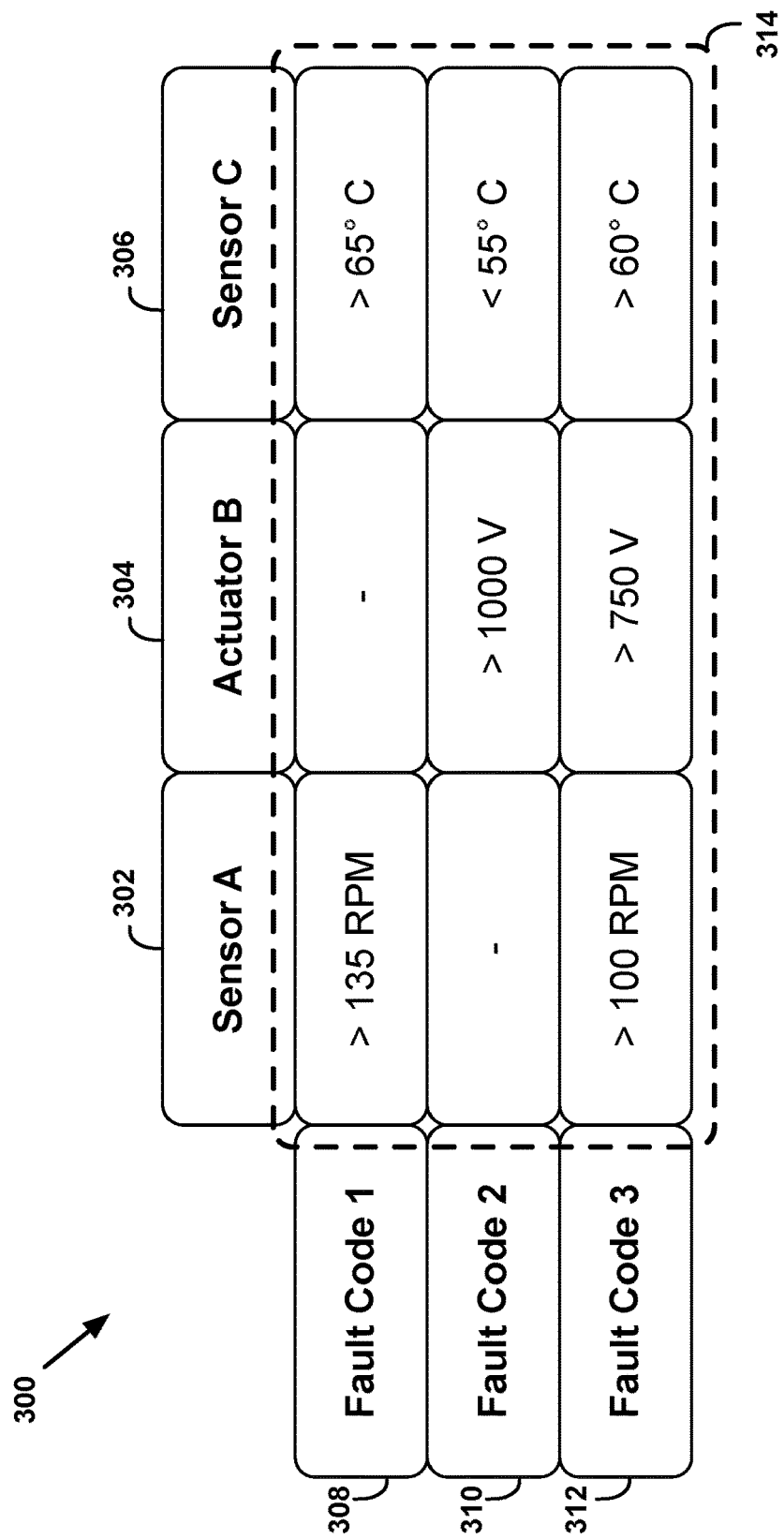
FIG. 3 depicts a conceptual illustration of example abnormal-condition indicators and triggering criteria.

FIG. 3 depicts a conceptual illustration of example abnormal-condition indicators and respective triggering criteria for an asset. In particular, FIG. 3 depicts a conceptual illustration of example fault codes. As shown, table 300 includes columns 302, 304, and 306 that correspond to Sensor A, Actuator B, and Sensor C, respectively, and rows 308, 310, and 312 that correspond to Fault Codes 1, 2, and 3, respectively. Entries 314 then specify sensor criteria (e.g., sensor value thresholds) that correspond to the given fault codes.

For example, Fault Code 1 will be triggered when Sensor A detects a rotational measurement greater than 135 revolutions per minute (RPM) and Sensor C detects a temperature measurement greater than 65° Celsius (C), Fault Code 2 will be triggered when Actuator B detects a voltage measurement greater than 1000 Volts (V) and Sensor C detects a temperature measurement less than 55° C., and Fault Code 3 will be triggered when Sensor A detects a rotational measurement greater than 100 RPM, Actuator B detects a voltage measurement greater than 750 V, and Sensor C detects a temperature measurement greater than 60° C. One of ordinary skill in the art will appreciate that FIG. 3 is provided for purposes of example and explanation only and that numerous other fault codes and/or triggering criteria are possible and contemplated herein.

Referring back to FIG. 2, the central processing unit 206 may be configured to carry out various additional functions for managing and/or controlling operations of the asset 200 as well. For example, the central processing unit 206 may be configured to provide instruction signals to the subsystems 202 and/or the actuators 205 that cause the subsystems 202 and/or the actuators 205 to perform some operation, such as modifying a throttle position. Additionally, the central processing unit 206 may be configured to modify the rate at which it processes data from the sensors 204 and/or the actuators 205, or the central processing unit 206 may be configured to provide instruction signals to the sensors 204 and/or actuators 205 that cause the sensors 204 and/or actuators 205 to, for example, modify a sampling rate. Moreover, the central processing unit 206 may be configured to receive signals from the subsystems 202, the sensors 204, the actuators 205, the network interfaces 210, the user interfaces 212, and/or the position unit 214 and based on such signals, cause an operation to occur. Further still, the central processing unit 206 may be configured to receive signals from a computing device, such as a diagnostic device, that cause the central processing unit 206 to execute one or more diagnostic tools in accordance with diagnostic rules stored in the data storage 208. Other functionalities of the central processing unit 206 are discussed below.

The network interface 210 may be configured to provide for communication between the asset 200 and various network components connected to the communication network 104. For example, the network interface 210 may be configured to facilitate wireless communications to and from the communication network 104 and may thus take the form of an antenna structure and associated equipment for transmitting and receiving various over-the-air signals. In practice, the network interface 210 may be configured according to a communication protocol, such as but not limited to any of those described above. In some cases, the asset 200 may not include the network interface 210. Other examples are possible as well.

The user interface 212 may be configured to facilitate user interaction with the asset 200 and may also be configured to facilitate causing the asset 200 to perform an operation in response to user interaction. Examples of user interfaces 212 include touch-sensitive interfaces, mechanical interfaces (e.g., levers, buttons, wheels, dials, keyboards, etc.), and other input interfaces (e.g., microphones), among other examples. In some cases, the user interface 212 may include or provide connectivity to output components, such as display screens, speakers, headphone jacks, and the like.

The position unit 214 may be generally configured to facilitate performing functions related to geo-spatial location/position and/or navigation. More specifically, the position unit 214 may be configured to facilitate determining the location/position of the asset 200 and/or tracking the asset 200's movements via one or more positioning technologies, such as a GNSS technology (e.g., GPS, GLONASS, Galileo, BeiDou, or the like), triangulation technology, and the like. As such, the position unit 214 may include one or more sensors and/or receivers that are configured according to one or more particular positioning technologies.

In example embodiments, the position unit 214 may allow the asset 200 to provide to other systems and/or devices (e.g., the asset data platform 102) position data that indicates the position of the asset 200, which may take the form of GPS coordinates, among other forms. In some implementations, the asset 200 may provide to other systems position data continuously, periodically, based on triggers, or in some other manner. Moreover, the asset 200 may provide position data independent of or along with other asset-related data (e.g., along with operating data).

The local analytics device 220 may generally be configured to receive and analyze data related to the asset 200 and based on such analysis, may cause one or more operations to occur at the asset 200. For instance, the local analytics device 220 may receive operating data for the asset 200 (e.g., signal data or derived data based on signal data generated by the sensors 204 and/or actuators 205) and based on such data, may provide instructions to the central processing unit 206, the sensors 204, and/or the actuators 205 that cause the asset 200 to perform an operation. In another example, the local analytics device 220 may receive location data from the position unit 214 and based on such data, may modify how it handles predictive models and/or workflows for the asset 200. In still another example, the central processing unit 206 may provide access to data in data storage 208 that was not generated by the sensors 204 and/or actuators 205 (e.g., data generated by an embedded computer). Other example analyses and corresponding operations are also possible.

To facilitate some of these operations, the local analytics device 220 may include one or more asset interfaces 221 that are configured to couple the local analytics device 220 to one or more of the asset's on-board systems. As such, the one or more asset interfaces 221 may take various forms, such as a diagnostic port or some other input/output connector.

For instance, as shown in FIG. 2, the local analytics device 220 may connect to the asset's central processing unit 206 via an asset interface 221, which may enable the local analytics device 220 to receive data at the direction of the central processing unit 206 (e.g., operating data that is generated by sensors 204 and/or actuators 205 and sent to the central processing unit 206, position data generated by the position unit 214, or other asset data from data storage 208) and then provide instructions to the central processing unit 206. In this way, the local analytics device 220 may indirectly interface with and receive data from other on-board systems of the asset 200 (e.g., the subsystems 202, sensors 204, and/or actuators 205) via the central processing unit 206.

Additionally or alternatively, as shown in FIG. 2, the local analytics device 220's asset interface 221 could interface to one or more sensors 204 and/or actuators 205, which may enable the local analytics device 220 to communicate directly with the sensors 204 and/or actuators 205.

Further still, the local analytics device 220 may additionally or alternatively connect to the asset via the local analytics device 220's network interface 226 and the asset's network interface 210. The local analytics device 220 may interface with the on-board systems of the asset 200 in other manners as well, including the possibility that the interfaces illustrated in FIG. 2 are facilitated by one or more intermediary systems that are not shown.

In example embodiments, the local analytics device 220 may be physically coupled to the asset 200 either at the time the asset 200 was manufactured or sometime after. That is, in some cases, the local analytics device 220 may be added to the asset 200 as after-market add-on equipment. Other examples are also possible.

Moreover, the local analytics device 220 may be configured to execute one or more operations that facilitate allowing the local analytics device 220 to interact with the asset data platform 102 on behalf of the asset 200. As one example, interacting with the asset data platform 102 may involve publishing asset-related data to the asset data platform 102. The asset data platform 102 may then utilize such data for various purposes, such as defining, updating, and/or modifying asset-related model-workflows. The provisioning operations are discussed in further detail below.

In practice, the local analytics device 220 may locally perform advanced analytics and associated operations, such as executing a predictive model and corresponding workflow, for the asset 200 that may otherwise not be able to be performed with the other on-asset components. As such, the local analytics device 220 may help provide additional processing power and/or intelligence to the asset 200.

It should be understood that the local analytics device 220 may also be configured to cause the asset 200 to perform operations that are not related to a predictive model. For example, the local analytics device 220 may receive data from a remote source, such as the asset data platform 102 or one or more output devices, and based on the received data cause the asset 200 to perform one or more operations. One particular example may involve the local analytics device 220 receiving a firmware update for the asset 200 from a remote source and then causing the asset 200 to update its firmware. Another particular example may involve the local analytics device 220 receiving a diagnosis instruction from a remote source and then causing the asset 200 to execute a local diagnostic tool in accordance with the received instruction. Numerous other examples are also possible.

As shown, in addition to the one or more asset interfaces discussed above, the local analytics device 220 may also include a processing unit 222, a data storage 224, and a network interface 226, all of which may be communicatively linked by a system bus, network, or other connection mechanism. The processing unit 222 may include any of the components discussed above with respect to the central processing unit 206. In turn, the data storage 224 may be or include one or more non-transitory computer-readable storage media, which may take any of the forms of computer-readable storage media discussed above.

The processing unit 222 may be configured to store, access, and execute computer-readable program instructions stored in the data storage 224 to perform the operations of a local analytics device described herein. For instance, the processing unit 222 may be configured to receive respective sensor and/or actuator signals generated by the sensors 204 and/or actuators 205 and may execute a predictive model and corresponding workflow based on such signals. Other functions are described below.

The network interface 226 may be one more network interfaces configured the same or similar to the network interfaces described above. In one example, the network interface 226 may facilitate communication between the local analytics device 220 and the asset data platform 102. Additionally or alternatively, the network interface 226 may facilitate communication between the local analytics device 220 and the provisioning device 114 (as depicted in FIG. 1 by communication path 112). In some such cases, the local analytics device 220 and provisioning device 114 may perform various "pairing" operations that create an ad-hoc network between the two devices, such as a Bluetooth connection, mesh network, or the like. It should be understood that the one or more network interfaces 226 allow the local analytics device 220 to communicate with other devices over separate networks and/or communication paths. For example, the local analytics device 220 may communicate with the asset data platform 102 via the communication network 104 (e.g., a cellular network) and with the provisioning device 114 via an ad-hoc network link 112 (e.g., Bluetooth, WiFi, CAN, LPWAN or mesh network) that is separate from the communication network 104. Other examples are also possible.

In some example implementations, the local analytics device 220 may include and/or communicate with a user interface that may be similar to the user interface 212. In practice, the user interface may be located remote from the local analytics device 220 (and the asset 200). Other examples are also possible.

While FIG. 2 shows the local analytics device 220 physically and communicatively coupled to its associated asset (e.g., the asset 200) via one or more asset interfaces, it should also be understood that this might not always be the case. For example, in some implementations, the local analytics device 220 may not be physically coupled to its associated asset and instead may be located remote from the asset 200. In an example of such an implementation, the local analytics device 220 may be wirelessly, communicatively coupled to the asset 200. Other arrangements and configurations are also possible.

For more detail regarding the configuration and operation of a local analytics device, please refer to U.S. application Ser. No. 14/963,207, which is incorporated by reference herein in its entirety.

One of ordinary skill in the art will appreciate that the asset 200 shown in FIG. 2 is but one example of a simplified representation of an asset and that numerous others are also possible. For instance, other assets may include additional components not pictured and/or more or less of the pictured components. Moreover, a given asset may include multiple, individual assets that are operated in concert to perform operations of the given asset. Other examples are also possible.

III. Example Platform

Figure 4:
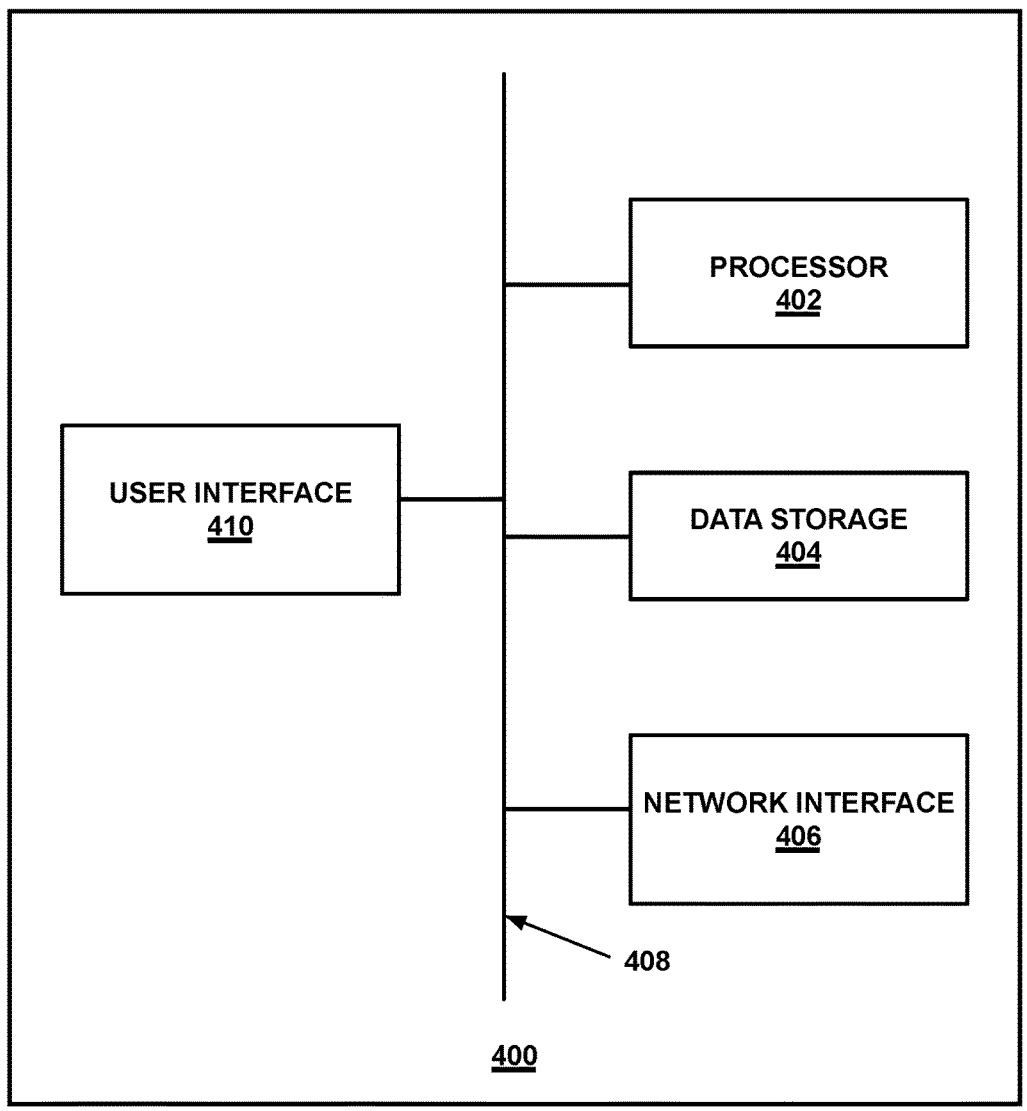
FIG. 4 depicts a structural diagram of an example platform.

FIG. 4 is a simplified block diagram illustrating some components that may be included in an example asset data platform 400 from a structural perspective. In line with the discussion above, the asset data platform 400 may generally comprise one or more computer systems (e.g., one or more servers), and these one or more computer systems may collectively include at least a processor 402, data storage 404, network interface 406, and perhaps also a user interface 410, all of which may be communicatively linked by a communication link 408, such as a system bus, network, or other connection mechanism.

The processor 402 may include one or more processors and/or controllers, which may take the form of a general- or special-purpose processor or controller. In particular, in example implementations, the processing unit 402 may include microprocessors, microcontrollers, application-specific integrated circuits, digital signal processors, and the like.

In turn, the data storage 404 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, an optical-storage device, etc.

The data storage 404 may be provisioned with software components that enable the platform 400 to carry out the functions disclosed herein. These software components may generally take the form of program instructions that are executable by the processor 402 and may be arranged together into applications, software development kits, toolsets, or the like. In addition, the data storage 404 may also be provisioned with one or more databases that are arranged to store data related to the functions carried out by the platform, examples of which include time-series databases, document databases, customer account databases, relational databases (e.g., MySQL), key-value databases, and graph databases, among others. The one or more databases in combination may also provide for polyglot storage.

The network interface 406 may be configured to facilitate wireless and/or wired communication between the platform 400 and various network components via the communication network 104, such as assets 106 and 108, data source 110, and provisioning device 114. As such, the network interface 406 may take any suitable form for carrying out these functions, examples of which may include wired or wireless technologies for local and/or remote communication, including Ethernet, serial bus interface (e.g., ModBus, OPC, CAN, RS-232 or RS-485, USB, etc.), a chipset and antenna adapted to facilitate wireless communication (e.g., any number of variants based on WiFi, Bluetooth, mesh, low power WAN, cellular or satellite), and/or any other interface that provides for wired and/or wireless communication. The network interface 406 may also include multiple network interfaces that support various different types of data and control message authentication, authorization, accounting, encoding, compression, encryption and transfer, which may be either standardized or proprietary, some examples of which may include JSON, CBOR, XML, and Base64, HTTP/S, COAP/S, DDS, MQTT, SSH, MOSH, TLS, DTLS, TCP, UDP, SMS, IPV4 and IPV6 or 802.15.4. Other configurations are possible as well.

The example asset platform 400 may also support a user interface 410 that is configured to facilitate user interaction with the platform 400 and may also be configured to facilitate causing the platform 400 to perform an operation in response to user interaction. This user interface 410 may include or provide connectivity to various input components, examples of which include touch-sensitive interfaces, mechanical interfaces (e.g., levers, buttons, wheels, dials, keyboards, etc.), and other input interfaces (e.g., microphones), as well as programmatic interfaces including local or network APIs. Additionally, the user interface 410 may include or provide connectivity to various output components, examples of which may include display screens, speakers, headphone jacks, and the like. Other configurations are possible as well, including the possibility that the user interface 410 is embodied within a client station that is communicatively coupled to the asset data platform 400.

Figure 5:
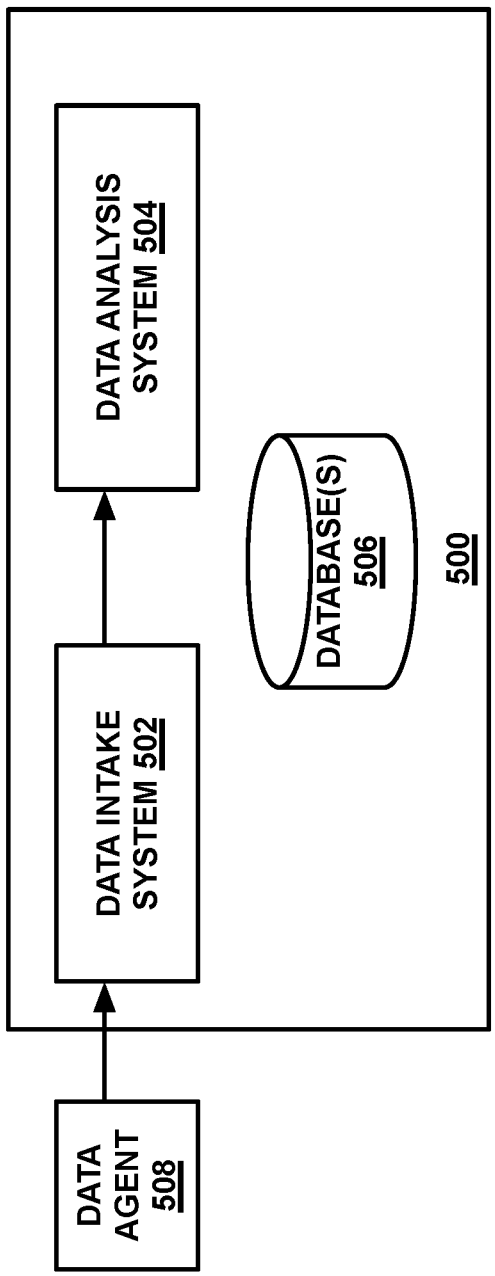
FIG. 5 depicts a functional block diagram of an example platform.

Referring now to FIG. 5, another simplified block diagram is provided to illustrate some components that may be included in an example asset data platform 500 from a functional perspective. For instance, as shown, the example platform 500 may include a data intake system 502 and a data analysis system 504, each of which comprises a combination of hardware and software that is configured to carry out particular functions. The platform 500 may also include one or more databases 506 coupled to one or more of the data intake system 502 and the data analysis system 504. In practice, these functional systems may be implemented on a single computer system or distributed across a plurality of computer systems.

The data intake system 502 may generally function to receive asset-related data and then provide at least a portion of the received data to the data analysis system 504. As such, the data intake system 502 may be configured to receive asset-related data from various sources, examples of which may include an asset, an asset-related data source, or an organization's existing infrastructure. The data received by the data intake system 502 may take various forms, examples of which may include analog signals, data streams, and/or network packets. Further, in some examples, the data intake system 502 may be configured according to a given dataflow technology, such as a NiFi receiver or the like.

In some embodiments, before the data intake system 502 receives data from a given source (e.g., an asset, an asset-related data source, an organization's existing infrastructure, etc.), that source may be provisioned with a data agent 508. In general, the data agent 508 may be a software component that functions to access the relevant data at the given data source, place the data in the appropriate format, and then facilitate the transmission of that data to the platform 500 for receipt by the data intake system 502. As such, the data agent 508 may cause the given source to perform operations such as compression and/or decompression, encryption and/or de-encryption, analog-to-digital and/or digital-to-analog conversion, filtration, amplification, and/or data mapping, among other examples. In other embodiments, however, the given data source may be capable of accessing, formatting, and/or transmitting data to the example platform 500 without the assistance of a data agent.

The data received by the data intake system 502 may take various forms. As one example, the received data may include operating data for an asset such as, for example, signal data (e.g., sensor and/or actuator data), abnormal-condition indicators, asset event indicators, and asset location data. As another, the received data may include external data related to asset operation such as, for example, asset inspection/maintenance/repair information, hotbox data, weather data, etc. As yet another example, the received data may also include metadata, signal signatures, or the like that provide additional information about the received data, such as an identifier of the data source and/or a timestamp associated with the received data (e.g., a date and/or time at which the information was obtained). For instance, a unique identifier (e.g., a computer generated alphabetic, numeric, alphanumeric, or the like identifier) may be assigned to each asset, and perhaps to each sensor and actuator, and may be operable to identify the asset, sensor, or actuator from which data originates. The data received by the data intake system 502 may take other forms as well.

The data intake system 502 may also be configured to perform various pre-processing functions on the received data before it provides that data to the data analysis system, to ensure that the received data is clean, up to date, and consistent across records or data structures stored in the platform 500 that manage the data. For example, the data intake system 502 may map the received data into defined data structures and potentially drop any data that cannot be mapped to these data structures. As another example, the data intake system 502 may assess the reliability (or "health") of the received data and potentially drop any unreliable data. As yet another example, the data intake system 502 may "de-dup" the received data by identifying any data has already been received by the platform and then ignoring or dropping such data. As still another example, the data intake system 502 may determine that the received data is related to data already stored in the platform's database 506 (e.g., a different version of the same data) and then merge the received data and stored data together into one data structure or record. As a further example, the data intake system 502 may organize the received data into particular data categories (e.g., by placing the different data categories into different queues). Other functions may also be performed.

In some embodiments, it is also possible that the data agent 508 may perform or assist with certain of these pre-processing functions. As one possible example, the data mapping function could be performed in whole or in part by the data agent 508 rather than the data intake system 502. Other examples are possible as well.

The data intake system 502 may further be configured to store the received data in the database 506 for later retrieval. In line with the discussion above, the database 506 may take various forms, examples of include a time-series database, document database, a relational database (e.g., MySQL), a key-value database, and a graph database, among others. Further, the database 506 may provide for poly-glot storage. For example, the database 506 may store the payload of received data in a first type of database (e.g., a time-series or document database) and store the associated metadata of received data in a second type of database that permits more rapid searching (e.g., a relational database). Other examples are possible as well.

As shown, the data intake system 502 may then be communicatively coupled to the data analysis system 504. This interface between the data intake system 502 and the data analysis system 504 may take various forms. For instance, the data intake system 502 may be communicatively coupled to the data analysis system 504 via an API. Other interface technologies are possible as well.

In one implementation, the data intake system 502 may provide, to the data analysis system 504, data that falls into three general categories: (1) signal data, (2) event data, and (3) asset status data. The signal data may generally take the form of raw or aggregated data representing the measurements taken by the sensors and/or actuators at the assets. The event data may generally take the form of data identifying events that relate to asset operation, such as asset events that correspond to indicators received from an asset (e.g., abnormal-condition indicators, asset event indicators, etc.), inspection events, maintenance events, repair events, fluid events, weather events, or the like. And asset status information may then include status information for the asset, such as an asset identifier, asset location data, etc. The data provided to the data analysis system 504 may also include other data and take other forms as well.

The data analysis system 504 may generally function to receive data from the data intake system 502, analyze that data, and then take various actions based on that data. For example, the data analysis system 504 may identify certain data that is to be output to a client station (e.g., based on a request received from the client station) and may then provide this data to the client station. As another example, the data analysis system 504 may determine that certain data satisfies a predefined rule and may then take certain actions in response to this determination, such as generating new event data or providing a notification to a user via the client station. As another example, the data analysis system 504 may use the received data to train and/or execute a predictive model related to asset operation, and the data analysis system 504 may then take certain actions based on the predictive model's output. As still another example, the data analysis system 504 may make certain data available for external access via an API.

In order to facilitate one or more of these functions, the data analysis system 504 may be configured to provide a web application (or the like) that can be accessed and displayed by a client station. This web application may take various forms, but in general, the web application may comprise one or more web pages that can be displayed by the client station in order to present information to a user and also obtain user input. As another example, the data analysis system 504 may be configured to "host" or "drive" (i.e., provide data to) a native client application associated with the asset data platform that is installed and runs on a client station.

In addition to analyzing the received data for taking potential actions based on such data, the data analysis system 504 may also be configured to store the received data into database 506. The database 506 may persistently store the data for subsequent access by the platform or by other platforms. Additional data-storage related operations are discussed in further detail below.

In some embodiments, the data analysis system 504 may also support a software development kit (SDK) for building, customizing, and adding additional functionality to the platform. Such an SDK may enable customization of the platform's functionality on top of the platform's hardcoded functionality.

The data analysis system 504 may perform various other functions as well. Some functions performed by the data analysis system 504 are discussed in further detail below.

In example embodiments, the asset data platform 500 may be configured to create and store customer accounts for entities that utilize services hosted by the asset data platform 500. In practice, a given customer account may be created based on data provided to the asset data platform 500 from an external device, such as the provisioning device 114, among other possibilities. A given customer account may include or otherwise be linked to databases that may include account credentials (e.g., username, passwords, etc.), asset-role identifiers, asset-management credentials, asset-management permissions, data-management credentials, data-management permissions, asset identifiers, asset status information (e.g., registered or unregistered), and/or asset-related data posted by provisioned local analytics devices. A customer account may include various other information and/or may be stored by other computing systems independent of the asset data platform.

One of ordinary skill in the art will appreciate that the example platform shown in FIGS. 4-5 is but one example of a simplified representation of the components that may be included in a platform and that numerous others are also possible. For instance, other platforms may include additional components not pictured and/or more or less of the pictured components. Moreover, a given platform may include multiple, individual platforms that are operated in concert to perform operations of the given platform. Other examples are also possible.

IV. Example Operations

The operations of the example network configuration 100 depicted in FIG. 1 will now be discussed in further detail below. To help describe some of these operations, flow diagrams may be referenced to describe combinations of operations that may be performed. In some cases, each block may represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process. Moreover, the blocks shown in the flow diagrams may be rearranged into different orders, combined into fewer blocks, separated into additional blocks, and/or removed based upon the particular embodiment.

The following description may reference examples where a single data source provides data to the asset data platform 102 that then performs one or more functions. It should be understood that this is done merely for sake of clarity and explanation and is not meant to be limiting. In practice, the asset data platform 102 generally receives data from multiple sources, perhaps simultaneously, and performs operations based on such aggregate received data.

A. Provisioning Local Analytics Devices

As mentioned above, in accordance with example embodiments, a local analytics device (e.g., the local analytics device 220) may be coupled to an asset (e.g., the asset 108) and undergo provisioning operations that allow the local analytics device to interact with the asset data platform 102 on behalf of the asset and a particular customer account hosted by the asset data platform 102.

For purposes of explanation and illustration, some of the provisioning operations may be discussed with reference to FIG. 7, which depicts a signal flow diagram 700 that shows example signal flows that may occur while provisioning a local analytics device. For these purposes, the operations causing the signal flows shown in the signal flow diagram 700 are described as being carried out by the local analytics device 220, the provisioning device 114, and the asset data platform 102, but other devices and/or systems may carry out these example operations. One of ordinary skill will appreciate that diagram 700 is provided for the sake of clarity and explanation and that numerous other combinations of operations may be utilized to facilitate the provisioning of a local analytics device.

1. Customer Account Information

As a preliminary matter, the asset data platform 102 may be configured to store account information for customers that obtain services that are hosted by the asset data platform 102. For instance, a given customer may own and/or operate the assets 106 and 108 and may utilize services provided by the asset data platform 102 that monitor the operating conditions of those assets. Specifically, a local analytics device may be utilized for each asset 106 and 108 to facilitate such asset monitoring.

Figure 6:
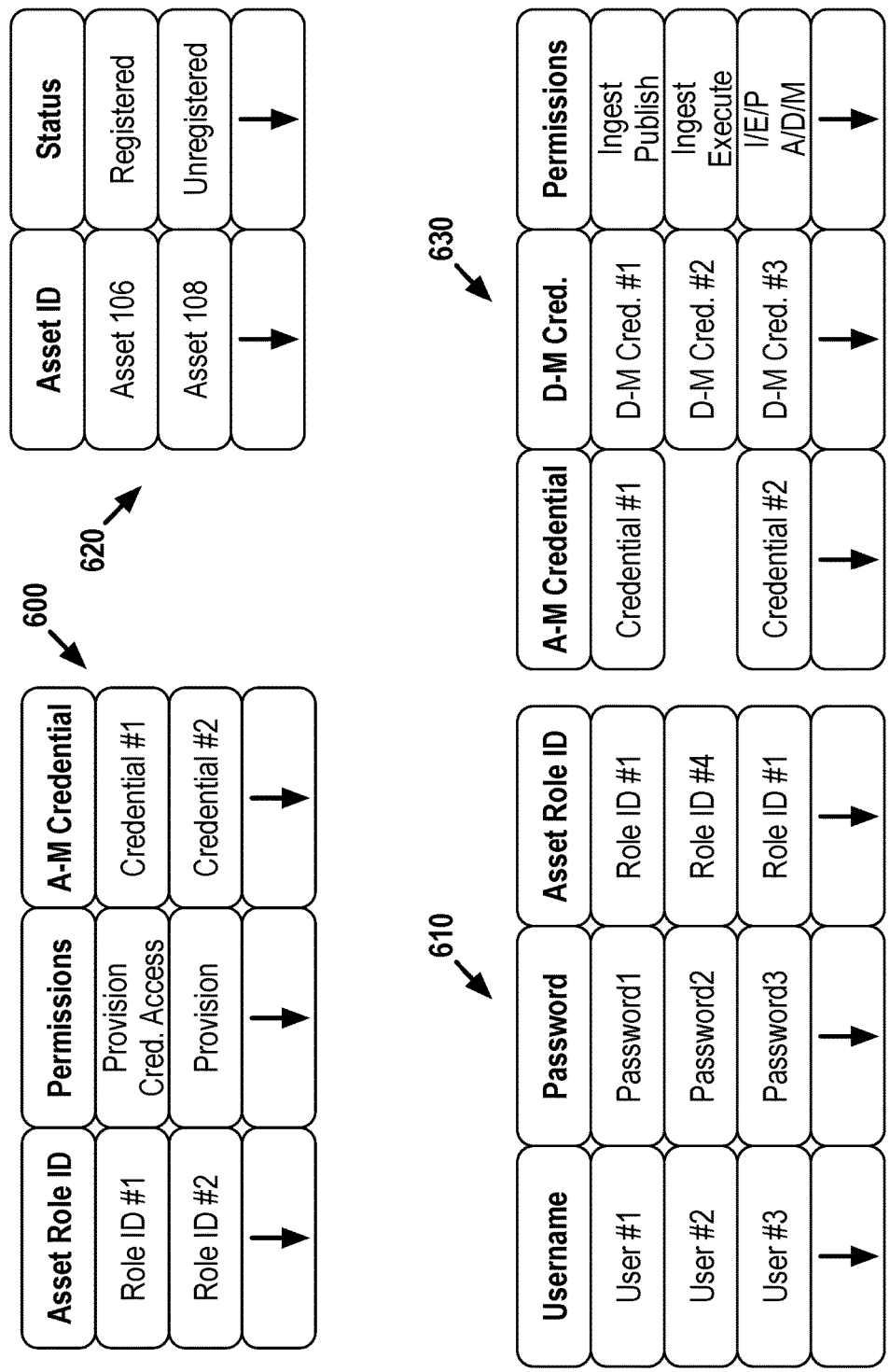
FIG. 6 depicts a conceptual illustration of information related to a customer account and relationships between such information.

A given customer account may include a variety of information and that information may be stored in a variety of manners. FIG. 6 depicts a conceptual illustration of examples of information related to a customer account and exemplary relationships between such information. As shown in FIG. 6, information related to the customer account is represented in tables 600, 610, 620, and 630. Specifically, the table 600 maps asset-management permissions (also referred to herein as "rights") to a particular asset role and to a particular asset-management credential that enables those permissions to be exercised. The table 610 maps a particular asset role to particular account credentials (e.g., a username and password combination). The table 620 generally provides a representation of the customer account's asset inventory and stores a registration status of each particular asset of the customer account. The table 630 associates asset-management credentials with data-management credentials and maps data-management permissions and data-management credentials that enable the corresponding permission to be exercised.

More specifically, the table 600 includes asset-role identifiers, asset-management permissions, and asset-management credentials. An asset-role identifier serves to distinguish one asset role from another asset role and may take various forms, such as a string of alphanumeric characters or the like (e.g., "Role ID #1"). In general, an asset role corresponds to a user's role with respect to the assets of the customer account, such as an asset owner, an asset administrator, an asset maintenance personnel, asset analytics specialist, etc. As such, some asset roles may have more inclusive asset permissions than other asset roles.

Asset-management permissions define the customer-account and asset administration related operations that may be performed or otherwise facilitated. Examples of such operations may involve facilitating the provisioning of a local analytics device and/or providing access to data-management credentials, among other operations. Thus, in example embodiments, an asset-management permission may define the particular operations that a provisioning device can perform on behalf of the customer account. Examples of such operations may include generating a data-management credential based on an asset-management credential to facilitate provisioning a local analytics device, accessing a data-management credential provided by an asset data platform, or transferring to a local analytics device a data-management credential without accessing the credential, among other examples. An asset-management credential serves to authorize an attempted customer-account related operation. For instance, an asset-management credential may enable a provisioning device to complete a provisioning process to allow a local analytics device to interact with the asset data platform 102 on behalf of a particular asset. That is, the asset-management credential may allow the local analytics device to be provisioned and/or may be utilized to provide the local analytics device authority to perform certain operations on behalf of a particular asset.

In example embodiments, an asset-management credential may take various forms, such as a string of alphanumeric characters or the like (e.g., "Credential #1") or a token. Additionally, the asset-management credential may include some level of security, such as some level of encryption, such that the credential is securely exchanged between authorized entities.

The table 610 includes account credentials (e.g., usernames and corresponding passwords) and a corresponding asset-role identifier. Other examples of account credentials, such as tokens, may be alternatively used. As such, the table 610 may be used to determine what role has been assigned to a particular user's account credentials. Notably, multiple usernames may have the same asset-role identifier and thus, may provide the same management permissions.

Table 620 includes asset identifiers that identify the assets of the customer account and asset statuses that identify whether a given asset is registered with the customer account (i.e., whether a local analytics device has been provisioned to interact with the asset data platform 102 on behalf of the particular asset).

Table 630 includes asset-management credentials, data-management credentials, and analytics permissions. As shown, each asset-management credential is associated with one or more data-management credentials. A data-management credential serves to authorize certain asset-related interactions. As mentioned above, various types of data-management credentials are possible, such as analytics and/or data transfer credentials. Generally, an analytics credential is related to operations that involve analyzing and/or processing asset data (e.g., an asset's signal data), while a data transfer credential is related to operations that involve exchanging asset data between devices and/or systems.

For instance, a data-management credential may enable a local analytics device to ingest data from a particular asset, to execute particular predictive models or perform other analytics for a particular asset, to add, delete, and/or modify asset-related data, to publish asset-related data to an asset data platform, or to cause the asset data platform to perform an operation on behalf of the asset, among numerous other examples. A data-management credential may take various forms.

Data-management permissions define asset-data-management related operations that may be performed or otherwise facilitated. As suggested above, data-management permissions may define the particular operations that a local analytics device can perform for a particular asset. Additionally or alternatively, in some example embodiments, data-management permissions may define the particular interactions that a local analytics device can partake in with the asset data platform 102 on behalf of a particular asset. Examples of such interactions may include publishing asset data to the asset data platform 102, instructing the asset data platform 102 to provide certain information or predictive models to the local analytics device, and/or instructing the asset data platform 102 to perform certain data services for the asset, among other examples.

Additionally or alternatively, a data-management credential and corresponding permissions (or perhaps a different type of credential-permission pair) may define the particular operations that a local analytics device can perform on behalf of itself. That is, based on such a credential, the local analytics device may be authorized to interact with the asset data platform 102 on behalf of itself. For instance, the local analytics device may be authorized to report back to the asset data platform 102 various information related to the operation or status of the local analytics device, such as the number of hours the local analytics device has been in use, the health of the local analytics device's battery, the current software version running on the local analytics device, and/or the current data models available on the local analytics device, among other examples. In this way, only authorized local analytics device can report such information back to the asset data platform 102.

The tables shown in FIG. 6 are provided merely for purposes of example and explanation. Information related to a customer account may take various other forms and may include other information that is not depicted. For example, although not shown, various asset operating data (e.g., signal and/or abnormal-condition data) for the assets of the customer account is stored in a manner so that it is associated with the customer account. Other examples of additional information are also possible.

2. Initiation of Provisioning Operations

Prior to asset-condition monitoring for the asset 108, the local analytics device 220 may be installed on the asset 108. Typically, this operation may involve a user (e.g., asset operator, technician, etc.) physically coupling the local analytics device to the asset 108. In example implementations, based on the design of the local analytics device 220, the local analytics device 220 may be physically coupled to asset 108 in a relatively simple manner without requiring expert knowledge and/or physical modification of the asset 108. For example, the local analytics device 220 may be physically coupled to the asset via an asset interface, such as an asset diagnostics port, which may allow the local analytics device 220 to communicate with one or more of the asset 108's on-board components and/or systems (e.g., sensor(s) 204, actuator(s) 205, the central processing unit 206, the data storage 208, etc.). In example embodiments, the local analytics device 220 may communicate with the asset 108 according to one or more asset communication protocols (e.g., J1939, etc.), which may depend on the asset type. The local analytics device 220 may be coupled to the asset 108 and communicate therewith in various other ways.

After the local analytics device 220 is coupled to the asset 108, it may be then configured to initiate operations that facilitate provisioning the local analytics device 220. In practice, the local analytics device 220 may initiate such operations based on a number of triggers ("initiation triggers"). In example embodiments, initiation triggers generally involve the local analytics device 220 detecting a change in physical state of the asset 108.

One example trigger may involve the local analytics device 220 determining that it is in a "power-on" state (e.g., that the local analytics device has powered-on from a powered-off state). In particular, the local analytics device 220 may detect that power has been applied to it based on the asset 108 being turned on or based on the local analytics device 220 receiving a manual power on input (e.g., via a switch, button, etc.), among other examples. In practice, the local analytics device 220 may receive power from the asset 108, may contain its own power source, or some combination of both.

Additionally or alternatively, an initiation trigger may take the form of the local analytics 220 being first installed on an asset and/or the local analytics device 220 receiving an instruction from a provisioning device based on the provisioning device executing a provisioning application. Other examples of initiation triggers are also possible.

3. Asset Discovery

Figure 7:
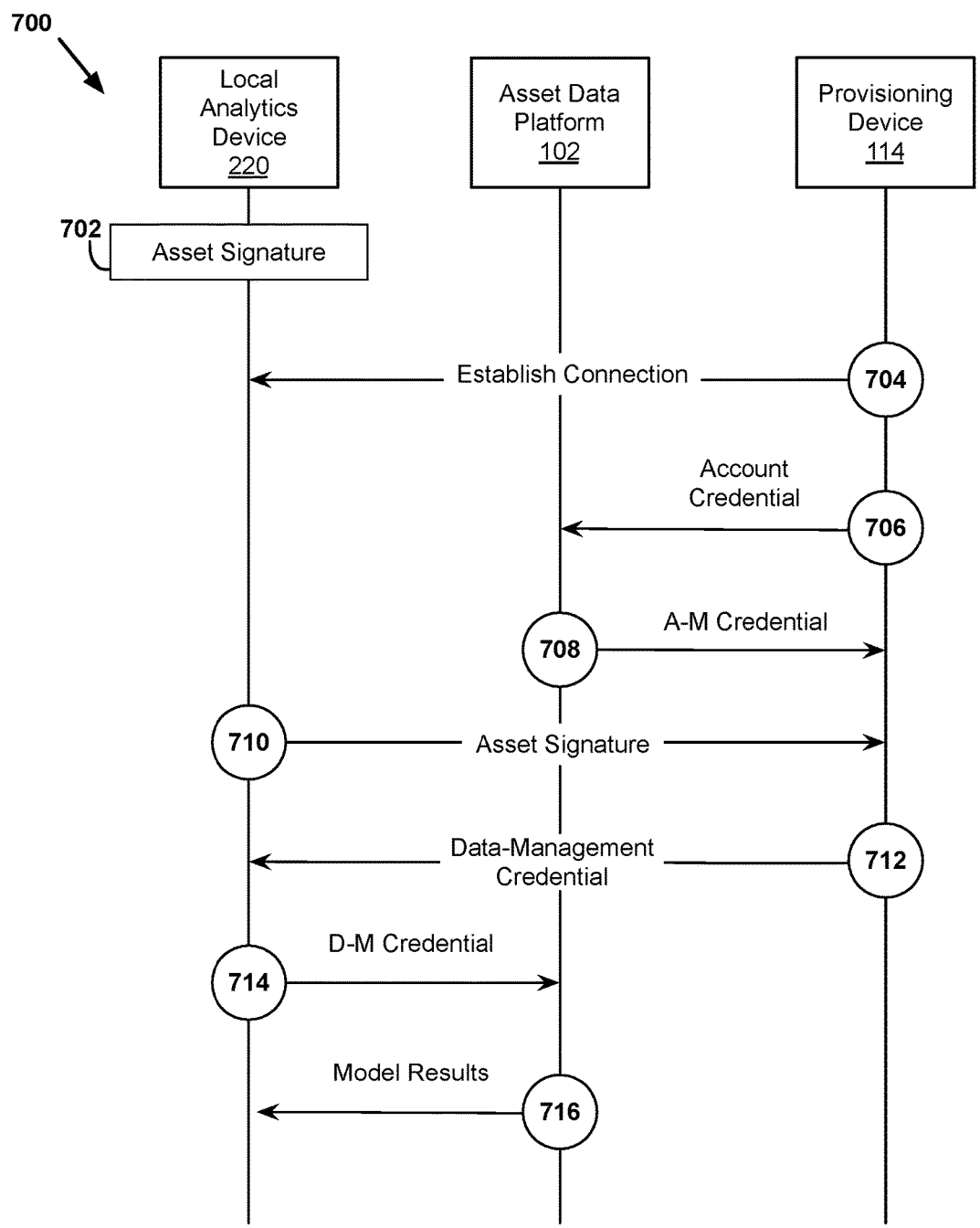
FIG. 7 is a signal flow diagram that depicts example signal flows that may occur while provisioning a local analytics device.

After the occurrence of an initiation trigger, the local analytics device 220 may perform asset discovery operations to determine the identity of the asset to which the local analytics device 220 is coupled (e.g., the asset 108), as identified in FIG. 7 at block 702. That is, the local analytics device 220 may be configured to determine information that is useful to identify the asset that it is coupled to. In practice, once such information is determined, the local analytics device 220, the provisioning device 114, the asset data platform 102, or some combination thereof may then confirm that that asset is associated with the particular customer account (discussed in detail below).

In general, the asset identification operations involve the local analytics device 220 determining an "asset signature" for the asset to which it is coupled that is indicative of configuration characteristics of the asset. An asset signature may include a particular sequence of data that is derived from results of a plurality of asset-identification operations. In particular, each asset signature correlates a particular combination of data and/or characteristics thereof (or in some cases, a single data or characteristic thereof) to a specific asset type, asset class, or unique asset configuration.

For example, a first asset configuration (e.g., a first brand of construction equipment) may correspond to a first combination of particular data characteristics, while a second asset configuration (e.g., a second brand of construction equipment) may correspond to a second combination of characteristics that differs in some way from the first combination of characteristics. Moreover, a third asset configuration (e.g., a first model of bulldozers of the first brand) may correspond to a third combination of characteristics that differs in some way from the first and second combinations. Further still, a fourth asset configuration (e.g., a year 2010 version of the first model of bulldozer) may correspond to a fourth combination of characteristics that differs in some way from the first, second, and third combinations. Various other examples and/or granularities are also possible.

Accordingly, an asset signature may enable the local analytics device 220 to, at a minimum, distinguish between the particular asset and any other asset that is also associated with the particular customer account. To that end, the asset signature may take various forms and may vary in the precision of the identification, which may depend on the particular context, customer account, and/or assets associated therewith.

For example, in a context where a customer account is associated with multiple assets but only one asset for any given type of asset (e.g., only one bulldozer, only one crane, etc.), then the asset signature may be relatively imprecise and still provide sufficient information to distinguish the asset (e.g., an asset-type signature). As another example, in a context where a customer account is associated with multiple assets of the same type, then the asset signature may be moderately precise (e.g., an asset-configuration signature). In yet another example where a customer account is associated with multiple assets of the same or similar configuration (e.g., a fleet of locomotives of the same make, model, etc.), then the asset signature may be highly precise (e.g., an asset-unique signature). Other examples are also possible.

Accordingly, in example embodiments, an asset signature may at least identify the type of the asset or the class of the asset, and in some cases, the asset signature may uniquely identify the asset from all other assets (e.g., down to the asset's serial or VIN number or the like).

As mentioned above, the local analytics device 220 may determine an asset signature in a number of manners. Generally, the local analytics device 220 determines an asset signature based on obtaining a plurality of asset data, where each asset data is indicative of a configuration parameter of the asset, such as a subsystem, component, software version, etc. that is part of the asset. The local analytics device 220 then utilizes the plurality of data to define the asset signature. Moreover, the local analytics device 220 may maintain a record of the sequence of operations that it used to generate the asset signature ("a signature sequence") to enable the local analytics device 220 and/or the asset data platform 102 to reproduce the asset signature for various reasons, such as asset confirmation (discussed in further detail below).

In a first example embodiment, the local analytics device 220 may determine an asset signature based on one or more queries to the asset 108 that return data indicative of the asset 108's configuration. The one or more queries and any respective responses may be based on an industry protocol, such as SAE 1939, or other electronic identification mechanism that may be specific to particular assets.

Specifically, the local analytics device 220 may transmit to the asset 108, via one or more asset interfaces, a request for identity information. The asset 108 may be configured to process the received request and facilitate fetching such information, or data from which such information can be derived, from one or more of the asset 108's on-board systems maintaining such information (e.g., data storage, etc.).

In practice, the asset 108 may maintain identity information, or data from which such information can be derived, that may take a variety of forms and/or include a variety of information. For instance, the identity information may include details regarding the asset 108's type, class (e.g., make, model, year, etc.), serial number, and/or other information regarding the asset 108's configuration. Additionally or alternatively, the identity information may include details regarding some or all of the asset 108's components or subsystems, such as their own respective configurations, firmware versions, serial numbers, etc.

In a particular example, the identity information may be in accordance with a certain standard, such as SAE J1939, and include information particular to that standard, such as Product Identifying Information and/or Component Identification Information. In another particular example, the identity information may not be in accordance with any particular standard. In yet other particular example, some identity information may be in accordance with a standard, while other identity information is not in accordance with a standard.

In any event, the local analytics device 220 may be configured to determine the asset signature based on the responses to the one or more queries. In some instances, this operation may involve the local analytics device 220 concatenating the query responses in a particular sequence that is then used as the asset signature. In other instance, the one or more query-responses themselves contain the asset signature. Indeed, in example embodiments, the asset 108 may be configured to auto-identify itself in a manner that does not require an explicit query action from the local analytics device 220.

In a second example embodiment, the local analytics device 220 may determine an asset signature based at least on passive data traffic monitoring of the asset 108. That is, the local analytics device 220 may define the asset signature for the asset 108 based on asset data and/or characteristics thereof that the local analytics device 220 obtains from the computer systems of the asset 108. In practice, this process may also involve active queries, which may be different in nature from those described above in the first example embodiment. As such, this second example embodiment may differ from the first example embodiment in that the local analytics device 220 defines the asset signature based on the nature of the asset 108's data, as opposed to on identity information that inherently provides some indication of the asset 108's configuration.

Generally, the particular data available from assets, as well as characteristics thereof, may vary based on asset type, class, and/or other asset configuration considerations. For instance, a particular type of asset may provide certain types of data or data with certain data characteristics that differ from that provided by an asset of a different type. As such, certain asset data and/or characteristics thereof may be indicative of an asset's identity. Examples of such data or characteristics thereof may include asset-component or asset-subsystem data (e.g., data indicative of the particular engine type, such as a unique character sequence of an engine currently installed in the asset that may be used for engine identification purposes), the types and/or sequences of signal data output by an asset, the format of data generated by an asset, and/or the data generated by an asset in response to certain requests. Other examples are possible as well.

In any event, as mentioned above, the local analytics device 220 may receive, monitor, or otherwise obtain from the asset 108 various asset data from which an asset signature can be derived. For instance, the local analytics device 220 may request and receive particular data from the asset 108, such as signal data generated by specific sensors and/or actuators, among other examples. It should be noted that, in some implementations, the local analytics device 220 may not be required to request asset data but instead, the asset 108 may be configured to automatically push certain data to the local analytics device 220 periodically or based on certain triggers. In another instance, the local analytics device 220 may additionally or alternatively monitor, via an asset interface, data traffic occurring on the asset 108. Other examples are also possible.

After obtaining the asset data, the local analytics device 220 may identify certain data and/or characteristics thereof for use in determining the asset signature, which may occur in a number of manners. For example, the local analytics device 220 may determine that certain types of data were received in response to certain requests, that monitored data included certain types of signal data, and/or that pushed data was provided in a particular format, among various other possibilities. In any event, the local analytics device 220 may then define the asset signature, which may involve the local analytics device 220 concatenating a particular sequence of the asset data, among other possibilities.

In a third example embodiment, the local analytics device 220 may determine an asset signature based on a data-model-based asset discovery process. In one particular example of such a discovery process, the local analytics device 220 may first execute one or more asset-identification predictive models based on asset data from the asset 108 that helps to identify the particular type of the asset 108 and then perform individualized procedures for that asset type to obtain from the asset 108 data and/or characteristics thereof that are used to generate an asset signature.

In general, a given asset-identification predictive model receives as inputs asset data and/or characteristics thereof and outputs a likelihood that the source of the inputted data (e.g., the asset 108) is of a particular asset type. Thus, in practice, the local analytics device 220 may include multiple asset-identification predictive models; one for each possible asset type that the local analytics device 220 could be coupled to. The local analytics device 220 may then execute each of these multiple asset-identification predictive models and use the results therefrom to help derive the asset signature.

Generally, an example model-based asset discovery process may include two phases: (1) a modeling phase during which one or more asset-identification models are defined and (2) an asset-type determination phase (e.g., an "execution phase"). In practice, these phases may be performed in a variety of manners. The below discussion provides examples of these phases and should not be construed as limiting.

The modeling phase is discussed in relation to an asset-configuration predictive model that outputs a likelihood that an asset is of a particular asset type. However, one of ordinary skill in the art will appreciate that such a modeling phase may be similarly used for other purposes as well.

The example modeling phase may involve the asset data platform 102 analyzing historical data for a plurality of assets of various asset types. From those assets, the asset data platform 102 may identify assets of the asset type for which the asset-configuration model is being defined. After identifying these assets of interest, the asset data platform may then determine from the historical data for those assets of interest, asset data and/or characteristics thereof ("training data") that are common amongst and/or are unique to that asset type.

Once the asset data platform 102 determines the training data, it may define one or more predictive models correlating the training data to a likelihood of a given asset being of the particular asset type. Specifically, the asset data platform 102 may define a relationship between (1) the training data and (2) a likelihood that the training data is indicative of the particular asset type. This defined relationship may embody the given asset-configuration predictive model for the particular asset type. In practice, such a relationship may be defined by utilizing one or more modeling techniques that return a probability between zero and one, such as a random forest technique, logistic regression technique, or other regression technique. Additional asset-type models may be similarly defined for each type of asset that a local analytics device may be coupled to.

After the asset data platform 102 defines the one or more asset-identification predictive models, the asset data platform 102 may provide the models to the local analytics device 220 for use in the discovery process. In practice, the asset data platform 102 may transmit the models to the local analytics device 220 via the communication network 104, or the models may be pre-loaded on the local analytics device 220. In either case, the asset data platform 102 and/or the local analytics device 220 may update and/or modify one or more of the models over time.

During the execution phase, the local analytics device 220 may execute the one or more asset-identification predictive models based on asset data obtained via the asset 108's asset interfaces. Specifically, the local analytics device 220 may input certain data and/or data indicative of characteristics thereof into the one or more models. In turn, the one or more asset-identification models may cause the local analytics device 220 to determine and output one or more probabilities (e.g., a value between 0-1) that the asset 108 is of a particular asset type.

Based on the outputs of the asset-identification models, the local analytics device may then identify the most likely type of the asset 108. In example embodiments, this process may involve determining the asset-identification model output with the highest probability. In other examples, this process may involve determining whether any of probabilities exceeds a confidence probability threshold, which may be a value (e.g., between 0-1) that defines the confidence level at which a prediction should be utilized to derive asset identification information. Such a confidence probability threshold may be a fixed or variable value that is defined by a computing device or a user.

In any event, after the local analytics device 220 identifies the most likely asset type of the asset 108, it may then perform certain procedures for that asset type to obtain from the asset 108 data and/or characteristics thereof that are used to generate the asset signature. For instance, based on the results of the predictive models, the local analytics device 220 may then monitor for certain asset data and/or query certain computer systems of the asset 108. Then, the local analytics device 220 may define the asset signature, which may be similar in form as discussed above.

Alternatively, if the local analytics device 220 is unable to identify a most likely asset type (e.g., if no probability exceeds the confidence probability threshold), the local analytics device 220 may be configured to transmit to the asset 108 additional requests for data in order to facilitate determining additional data and/or characteristics thereof. These additional requests may be based on the previously output probabilities for the asset-identification models that were numerically closest to the confidence probability threshold. That is, the additional requests may be specifically tailored to determine particular data of interest known to be exhibited by certain types of assets. In any event, the local analytics device 220 may be configured to determine asset identification information based on predictive models in various other manners as well.

The above discussion has set forth various ways in which the local analytics device 220 may determine asset signatures. It should be noted, however, that local analytics device 220 may utilize any one, all, or some combination of the described processes (or some other processes) to determine asset signatures. For example, the local analytics device 220 may utilize a query-based approach to determine the asset 108's Component Identification Information and a messaging-traffic-based approach to determine the asset 108's make or model. Various other combinations are also possible. Moreover, some or all of the asset discovery operations discussed above may involve some level of assistance from the asset data platform 102. Other examples are also possible.

As discussed in further detail below, after the local analytics device 220 determines an asset signature for the asset 108 that it is attached to, the local analytics device 220 may provide that asset signature to other devices, such as the provisioning device 114, to help in the provisioning operations. Moreover, the local analytics device 220 may store the asset signature in data storage for use in the provisioning process and for subsequent retrieval to confirm a connected asset's identity after the local analytics device has been power cycled, as discussed in further detail below.

4. Asset Confirmation

In example embodiments, the local analytics device 220 may be further configured to evaluate whether the asset to which the local analytics device 220 is currently coupled (e.g., the asset 108) is the same asset that the local analytics device 220 last obtained data for. For instance, after the local analytics device 220 is powered on from a powered-off state, the local analytics device 220 confirms that the asset that it is presently coupled with is the same asset that it was coupled with prior to the powered-off state.

The local analytics device 220 may perform this operation in a variety of manners. As one example, the local analytics device 220 may store in memory an asset signature for the last asset that it was coupled with and compare that asset signature with the asset signature that is presently determined.

In another example, the local analytics device 220 may perform this confirmation process independent of any determined asset signature. For example, in one embodiment, the local analytics device 220 may store in memory the most recent signature sequence and responses thereto and then utilize that stored information to perform the asset confirmation. Specifically, the local analytics device 220 may replicate the same sequence of operations identified by the signature sequence (or some portion thereof) and confirm that it obtains the same responses as the stored responses. If the local analytics device 220 does in fact obtain the same responses, it may then infer that it is still coupled to the same asset. Otherwise, it may infer that it is coupled to a different asset. In example embodiments, instead of replicating the same sequence of operations identified by the signature sequence, the local analytics device 220 may be configured to execute a functionally equivalent set of operations that facilitate confirming the asset.

If the local analytics device 220 confirms that the asset it is presently coupled with is the same asset that it last obtained data for, then the local analytics device 220 continues operating in a "paired to a specific asset" state. For instance, the local analytics device 220 may continue with the provisioning process or may interact with the asset data platform 102 on behalf of the asset 108, assuming it is authorized to do so.

Otherwise, the local analytics device 220 may enter a state (e.g., an "unprovisioned state") where the local analytics device 220 preserves any data that it locally stored on behalf of the previous asset and/or isolates any data for the previous asset from the data for the present asset, such as by allocating particular memory for data collected on behalf of the present asset that is separate from the memory storing data for the previous asset. In this way, the local analytics device 220 helps to ensure that it does not corrupt the data for the present asset or the data for the previous asset. Thereafter, the local analytics device 220 may continue with the provisioning process with respect to the present asset.

Additionally, in example embodiments, the local analytics device 220 may at some later time transmit the data for the previous asset to the asset data platform 102 and/or provide to the asset data platform 102 a notice that the local analytics device 220 is no longer coupled with the previous asset, thereby allowing the asset data platform 102 to track whether assets have an active, connected local analytics device.

5. Coupling Provisioning & Local Analytics Device

Before, after, or while the local analytics device 220 determines the asset signature, a communication link may be established between the local analytics device 220 and the provisioning device 114. For example, returning to FIG. 7, at 704, the provisioning device 114 may seek to establish a network connection with the local analytics device 220. In example embodiments, this operation may involve the provisioning device 114 broadcasting an "alive" message, which may generally indicate that the provisioning device 114 is ready to connect to a local analytics device. In some cases, the provisioning device 114 may broadcast such a message based on the provisioning device 114 receiving an input via the provisioning application and/or receiving from the asset data platform 102 a provisioning credential, among other examples. While FIG. 7 depicts the provisioning device 114 initiating the connection to the local analytics device 220, this may not always be the case. Indeed, in some example embodiments, the local analytics device 220 may instead initiate a connection to the provisioning device 114, which may be based on detecting one or more of the trigger events discussed above.

In a particular example, either the local analytics device 220 or the provisioning device 114 may attempt to establish a connection (e.g., "pair") with each other via an ad-hoc network (e.g., Bluetooth, mesh, WiFi, etc.), in which case the alive message may take the form of a periodically broadcasted device discovery message (e.g., "inquiry message"). In turn, the devices may be configured to "listen" or scan for a device discovery message. Once a device "hears"

the device discovery message, it may transmit a response message including information needed to establish an ad-hoc network connection. The devices may then perform a paging procedure to facilitate establishing the network connection. Alternatively, the local analytics device 220 and the provisioning device 114 may be coupled over a communication link other than an ad-hoc network connection, such as a wired, WAN (e.g., cellular network), or LAN connection, among other examples.

6. Exchange of Credentials

Before, after, or while a network connection is established between the local analytics device 220 and the provisioning device 114, the provisioning device 114 may act in concert with the asset data platform 102 to authenticate one or more customer accounts. For example, the provisioning device 114 may receive, via the provisioning application, an account credential (e.g., a username and password combination or other authentication credential) via a log-in event. The provisioning device 114 may then, at 706 of FIG. 7, transmit the account credential (or a representation thereof) to the asset data platform 102, which in turn may or may not authenticate the log-in attempt and either provide or deny access to the customer account.

In some cases, a customer account may not exist yet. Accordingly, the provisioning device 114 may receive inputs, via the provisioning application, that facilitate creating a new customer account. The provisioning device 114 may provide data indicative of such inputs to the asset data platform 102, which in turn may register the new account and store information for that account. As discussed above, the asset data platform 102 may maintain a plurality of customer accounts, each of which may include or otherwise be linked to databases that may include various information related to customer accounts, such as information shown in FIG. 6, among other information.

In any event, after the asset data platform 102 receives the account credential from the provisioning device 114, it may proceed to determine whether to authenticate that account credential. For instance, returning to FIG. 6, the asset data platform 102 may be configured to cross-reference the table 610 with the received account credential and for example, determine whether the username and password combination match any row in the table 610. If the asset data platform 102 determines that the account credential matches a row in the table 610, the asset data platform 102 may determine the asset-role identifier for that row and reference the table 600 to identify a corresponding asset-management credential and/or asset-management permissions.

Then, at 708 of FIG. 7, the asset data platform 102 may provide to the provisioning device 114 at least the identified asset-management credential and one or more asset identifiers that identify the asset inventory of the customer account, and perhaps also an indication of the asset-management permissions. More specifically, the one or more asset identifiers identify registered and unregistered assets associated with the particular customer account. After the provisioning device 114 has received the asset-management credential and asset identifiers, the provisioning device 114 may store this information for use in the provisioning process.

On the other hand, if the asset data platform 102 determines that the account credential does not match any row in the table 610, it may then instead transmit a notification to the provisioning device 114 that access is denied. Similarly, in example embodiments, even if the asset data platform 102 determines that there is a match, the asset data platform 102 may nonetheless deny access if the asset-management permissions associated with that account credential does not cover the attempted interaction. For instance, if the asset data platform 102 receives the account credential from a device executing a provisioning application and that account credential is not associated with a provisioning permission, then the asset data platform 102 may provide an appropriate notification back to that device. The asset data platform 102 may authenticate account credentials in a variety of different manners, and/or computing systems independent of the asset data platform 102 may carry out such authentication processes.

Notably, the exchange of account and asset-management credentials by the provisioning device 114 and asset data platform 102 does not have to occur after the local analytics device 220 is coupled to the asset 108 or a network connection is established between the local analytics device 220 and provisioning device 114. Rather, the provisioning device 114 and asset data platform 102 may authenticate account credentials at any time, so long as a communication path (e.g., network connection) exists between the two.

At some point in time after the communication link is established between the local analytics device 220 and the provisioning device 114, the local analytics device 220 may, at 710 of FIG. 7, transmit to the provisioning device 114 the asset signature that was determined by the local analytics device 220. Based at least on the asset signature, the provisioning device 114 may determine whether the asset 108 that the local analytics device 220 is attached to is indeed associated with the particular customer account. The provisioning device 114 may perform this operation in a variety of manners.

In practice, a particular asset identifier has a relationship to a particular asset signature. In example embodiments, a particular asset identifier is a truncated, representation of a particular asset signature. As such, an asset identifier may take a variety of forms, such as an alphanumeric text string, a token, or the like. The use of asset identifiers may be advantageous over using full asset signatures, which are typically much larger in terms of data size, because the asset identifiers are exchanged between devices across the communication network 104 for a variety of reasons. As such, the use of asset identifiers helps to conserve network bandwidth, to reduce data usage, and may help deliver accurate communications when network connectivity is limited. To utilize asset identifiers, a mapping between asset signatures and asset identifiers for a given customer account is defined.

Accordingly, asset identifiers may be generated in a variety of manners. In an example embodiment, the local analytics device 220 and/or the provisioning device 114 provides the asset signature to the asset data platform 102, which in turn determines whether that asset signature is currently mapped to an asset identifier. If not, the asset data platform 102 may generate an asset identifier that maps to that asset signature and store that identifier and association in a database. In example embodiments, when the asset data platform 102 generates an asset identifier, that identifier is at least unique for the particular customer account and may be globally unique across all customer accounts. After the asset data platform 102 generates the asset identifier and stores the association with the asset signature (or if the asset data platform 102 determines that the asset signature is already mapped to an asset identifier), it may then inform the local analytics device 220 and/or the provisioning device 114 of the asset identifier and association.

In another example embodiment, the local analytics device 220 and/or the provisioning device 114 may locally generate an asset identifier for the asset signature, which may be necessary if there is no data connection back to the asset data platform 102. Some time later, the local analytics device 220 and/or the provisioning device 114 may provide the asset data platform 102 the asset identifier and associated asset signature. In scenarios where the asset identifier that was locally generated is not unique (e.g., globally or for the particular customer account), the asset data platform 102 may replace the asset identifier, update the mapping, and inform the provisioning and local analytics devices of the update. Other examples are also possible. Accordingly, the asset data platform 102, the provisioning device 114, and the local analytics device 220 may each maintain a mapping of asset signatures to asset identifiers for the particular customer account that can be dynamically updated.

Returning to the provisioning operations, the provisioning device 114 may utilize the received asset identifiers and the received asset signature to verify that the asset 108 is indeed an asset associated with the particular customer account. That is, the provisioning device 114 may determine whether the asset signature corresponds with one of the asset identifiers identifying an unregistered asset of the customer account. For example, if the account identifiers indicate that the particular customer account does not include an unregistered asset (e.g., all assets are registered), then the provisioning device 114 may infer that the asset 108 is not associated with this customer account and terminate the provisioning process for that customer account.

Alternatively, instead of the local analytics device 220, at 710 of FIG. 7, transmitting the asset signature to the provisioning device 114, the local analytics device 220 may itself identify the asset based on the asset signature and transmit to the provisioning device 114 the appropriate asset identifier. For example, the local analytics device 220 may compare the determined asset signature to a plurality of asset signatures locally stored by the local analytics device 220 and associated with corresponding asset identifiers also locally stored. In example embodiments, the local analytics device 220 may have previously received one or more of the plurality of asset signatures from the asset data platform 102 that maintains the master database of such signatures. As such, the local analytics device 220 and the asset data platform 102 may collaboratively perform asset discovery operations to facilitate identifying the particular asset to which the local analytics device 220 is connected.

In any event, based on this comparison, the local analytics device 220 may locate a stored asset signature matching (or most closely matching) the asset signature determined for the asset 108. From the matching signature, the local analytics device 220 may then determine the corresponding asset identifier and transmit that identifier to the provisioning device 114.

In some scenarios, neither the local analytics device 220 nor the provisioning device 114 can confirm that the asset signature corresponds to a particular asset associated with the particular customer account. Assuming there is a network connection back to the asset data platform 102, the local analytics device 220 and/or the provisioning device 114 may provide to the asset data platform 102 part or all of the asset signature, which may then assist in this confirmation step.

If there is no network connection back to the asset data platform 102 (or if the asset data platform 102 cannot confirm), the provisioning device 114 may query the user to assist in this confirmation step. In particular, the provisioning device 114 may instruct the user to use the provisioning device 114 to capture an image of the asset 108's identification tag or the like (e.g., a VIN plate) or instruct the user to manually enter such asset identification information. For example, the provisioning device 114 may include a digital camera configured to capture and process images. The provisioning device 114 may capture an image of an identification tag or the like and then extract from that image asset identification information. However, such procedures may be less reliable and/or more prone to errors than the procedures discussed above. In any event, any information obtained manually may be provided to the asset data platform 102 so that the asset data platform 102 can supplement its asset signature-identifier mapping to help expand the knowledge of the asset 108's identity.

Before, after, or simultaneous with confirming that the local analytics device 220 is attached to a particular asset that is associated with the particular customer account, the provisioning device 114 may determine whether the one or more asset-management credentials that it received from the asset data platform 102 (e.g., at 708 of FIG. 7) provide the provisioning device 114 provisioning permission for the particular asset (e.g., the asset 108). If the provisioning device 114 confirms this and the asset is confirmed, then the provisioning device 114 may, at 712 of FIG. 7, provide to the local analytics device 220 one or more data-management credentials.

In example embodiments, before exchanging any data-management credential, the provisioning device 114 may first identify a data-management credential that should be transferred to the local analytics device 220, which may be performed in a variety of manners. As one example, the provisioning device 114 identifies the data-management credential by receiving the data-management credential from the asset data platform 102, perhaps along with the asset-management credential, and determining that the data-management credential is for the local analytics device 220. As discussed above, depending on the provisioning device 114's permissions, the provisioning device 114 may or may not have access to the data-management credential before it transmits the credential to the local analytics device 220.

In another example, the provisioning device 114 identifies the data-management credential by generating or otherwise deriving the data-management credential based on the received asset-management credential. For instance, the provisioning device 114 may generate the data-management credential based on some information included in the asset-management credential, generate a modified version of the asset-management credential (e.g., an asset-specific credential), or generate an electronic item associated with the asset-management credential (e.g., a token) that serves as the data-management credential. Other possibilities also exist.

As such, the provisioning device 114 may receive an asset-management credential that it utilizes to exchange a data-management credential, where asset-management and data-management credentials differ from one another but are both associated with the customer account. As discussed above, the asset-management and data-management credentials may differ as to the scope of permissions that are associated with each. For instance, a given asset-management credential may be associated with a broader scope of permissions than a given data-management credential. Likewise, a first asset-management credential (e.g., one associated with asset identification, data ingestion, analytics, and provisioning permissions) may be associated with a broader scope of permissions than a second asset-management credential (e.g., a "provisioning" credential that is limited to provisioning based permissions). Similarly, a first data-management credential may be associated with a broader scope of permission than a second data-management credential. Other examples are possible.

In any event, the local analytics device 220 receives the one or more data-management credentials from the provisioning device 114, thereby completing the provisioning process. The local analytics device 220 may then store the received information in data storage to later perform operations on behalf of the asset 108, as discussed below.

7. Operating on Behalf of Asset

The local analytics device 220 may utilize the received data-management credential to interact with the asset 108 and/or with the asset data platform 102 on behalf of the asset 108. In some example embodiments, the local analytics device 220 may also receive from the provisioning device 114 (or perhaps the asset data platform 102) an indication of the permissions corresponding to the data-management credential (e.g., as defined in the table 630 of FIG. 6), which may then dictate the type of operations that the local analytics device 220 may perform on behalf of the asset 108.

In example embodiments, the local analytics device 220 interacting with the asset data platform 102 involves, at 714 of FIG. 7, the local analytics device 220 transmitting to the asset data platform 102 an operation instruction that includes at least the data-management credential and perhaps also the asset identifier (e.g., representing a truncated version of the asset signature). Based on that credential, the asset data platform 102 may determine (e.g., via the permissions from the table 630 for that data-management credential) whether the local analytics device 220 has authority to perform or cause the asset data platform 102 to perform a particular operation in accordance with the operation instruction. In the event that the local analytics device 220 is not so authorized, the asset data platform 102 may deny that interaction by the local analytics device 220 and perhaps provide an appropriate notification to the local analytics device 220 and/or the provisioning device 114.

At 716 of FIG. 7, the asset data platform 102 confirmed that the local analytics device 220 is authorized to interact with the asset data platform 102 on behalf of the asset 108 and as a result, followed the operation instruction provided by the local analytics device 220. In this example, the local analytics device 220 interacted with the asset data platform 102 by publishing asset-related data on behalf of the asset 108 to the asset data platform 102 and instructing the asset data platform 102 to execute one or more predictive models based on such data for the asset 108. The asset data platform 102 executed those models and provided the results therefrom back to the local analytics device 220.

The asset-related data published by the local analytics device 220 to the asset data platform 102 may take a variety of forms, such as signal data (e.g., sensor and/or actuator data), position data generated by the asset 108, abnormal condition indicators triggered by the asset 108, and/or outputs of predictive models executed by the local analytics device 220. The local analytics device 220 may publish various other forms of asset-related data. Furthermore, the local analytics device 220 may publish the asset-related data continuously, periodically, and/or upon an asset-related event occurrence (e.g., triggered abnormal condition indicator, generated predictive model output, etc.). Asset-related data is discussed in further detail below.

The local analytics device 220 may interact with the asset data platform 102 on behalf of the asset 108 in a variety of other manners as well. For example, it may instruct the asset data platform 102 to allow it to download from the asset data platform 102 certain predictive models for local execution by the local analytics device 220 based on operating data from the asset 108. As another example, it may instruct the asset data platform 102 to perform various operations for the asset 108, such as perform one or more data services for the asset 108's data. Various other examples are also possible.

In example embodiments, the asset data platform 102 may be configured to revoke (e.g., invalidate) a given credential at any time. In such instances, the asset data platform 102 may or may not provide an explicit revocation notification to the local analytics device 220. In instances where such a notification is not provided, any subsequent data management attempt by the local analytics device 220 would fail. In instances where such a notification is provided, the local analytics device 220 would require a new credential before attempting any data management operations related to that revoked credential. Other examples are also possible.

8. Operating without Complete Network Availability

The foregoing discussion in reference to FIG. 7 assumed that communication paths existed between the local analytics device 220 and asset data platform 102 and the provisioning device 114 and asset data platform 102. However, such communication paths may not always be present or if present, the quality and/or reliability of the present path may be below a threshold quality and/or reliability value. Even so, the local analytics device 220 may still be able to be provisioned, if at a minimum the local analytics device 220 and provisioning device 114 are able to communicate with one another.

For instance, the local analytics device 220 may be provisioned even if only the provisioning device 114 is able to communicate with the asset data platform 102 (i.e., even if the local analytics device 220 cannot directly communicate with the asset data platform 102). In such an example, the provisioning device 114 may perform one or more operations on behalf of the local analytics device 220 to facilitate provisioning it.

For example, the provisioning device 114 may act in concert with the asset data platform 102 to authenticate account credentials, as discussed above. Furthermore, the local analytics device 220 may be configured to determine that no communication path exists between it and the asset data platform 102 (e.g., no network connection, poor quality connection, etc.), and based on that determination, transmit the asset 108's asset signature to the provisioning device 114. Thereafter, the provisioning device 114 may forward to the local analytics device 220 a data-management credential, in line with the above discussion. In this example, the local analytics device 220 may be configured to collect and locally store asset-related data and may publish that data or otherwise interface with the asset data platform 102 upon detecting a network connection between it and the asset data platform 102 at a time in the future.

Figure 8A:
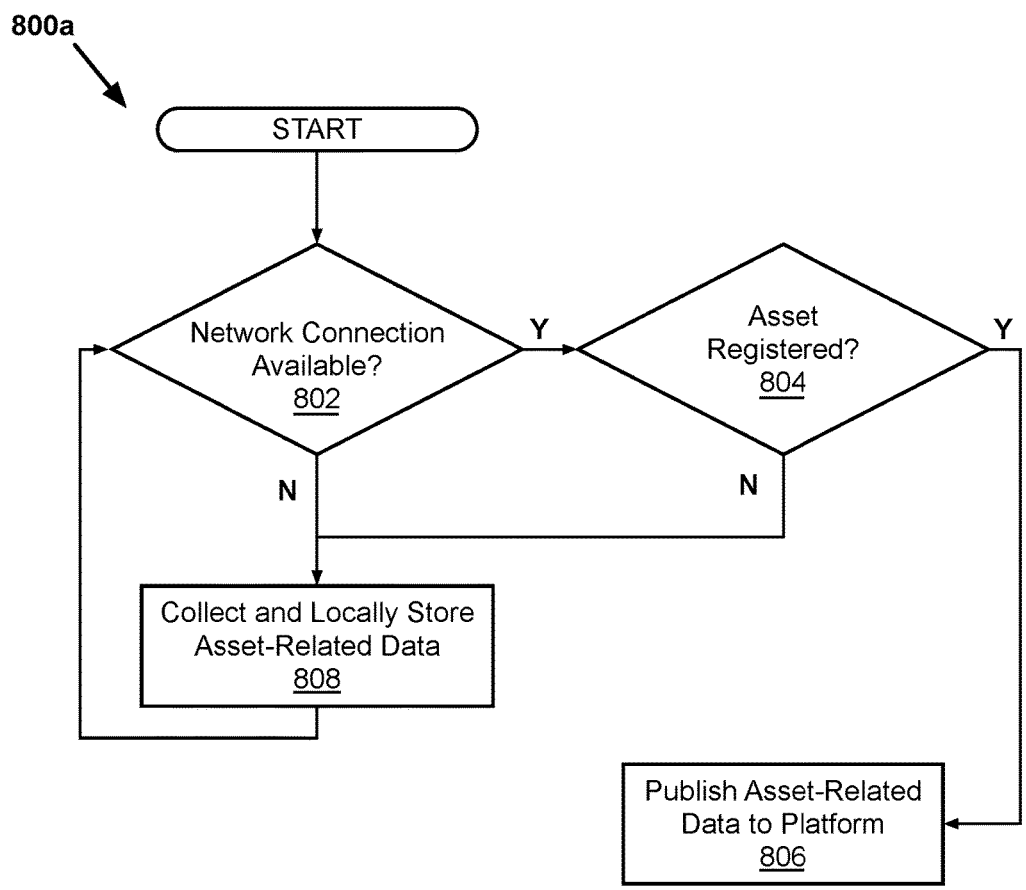
FIG. 8a is a flow diagram that depicts example operations that may occur for determining whether to store asset-related data locally.

FIG. 8a is a flow diagram 800a that depicts example operations for determining whether to publish or locally store asset-related data. After the local analytics 220 detects certain changes in physical state of the asset 108 (e.g., detecting a power-on state) and has confirmed that it is still connected to the previously identified asset 108 (as discussed above), at block 802, it may determine whether a network connection is available to the communication network 104 (e.g., whether a communication path exists between the local analytics device 220 and the asset data platform 102). If a network connection is available (block 804), the local analytics device 220 may communicate with the asset data platform 102 to determine whether the asset 108 is registered (e.g., whether the table 620 indicates a registered state for the asset 108). If the local analytics device 220 determines that the asset 108 is in fact registered in the customer account, it may publish, at block 806, asset-related data on behalf of the asset 108 or otherwise interact with the asset data platform 102 on the asset 108's behalf. However, if the local analytics device 220 determines that no network connection is available and/or that the asset 108 is unregistered, at block 808, it may collect and locally store asset-related data.

In practice, the local analytics device 220 may repeat the example process depicted by FIG. 8a during operation by (perhaps periodically or continuously) checking for an available network connection in order to publish asset-related data to the asset data platform 102 on behalf of the asset 108. However, the local analytics device 220 may be configured to enter an "offline" mode, for instance, to conserve battery power when external power is unavailable or if it was programmed to "wake" for specific times and durations. In such instances, the local analytics device 220 may be configured to forgo some or all of the operations of FIG. 8a.

In another example, the local analytics device 220 may be provisioned even if only the local analytics device 220 is able to communicate with the asset data platform 102 (i.e., even if the provisioning device 114 cannot directly communicate with the asset data platform 102). As noted above, the provisioning device 114 and asset data platform 102 may act in concert to authenticate account credentials at a time when a communication path exists between the two. The provisioning device 114 may also be configured to locally store an asset-management credential along with asset identifiers representing the customer account's asset inventory from an authenticated log-in event, such as an asset-management credential for the most recently authenticated account credentials, and derive an data-management credential therefrom. Alternatively, the provisioning device 114 may be configured to locally store a data-management credential from a prior provisioning operation.

Accordingly, in a scenario in which no communication path exists between the provisioning device 114 and asset data platform 102, the provisioning device 114 may transmit a previously stored data-management credential to the local analytics device 220 or generate a data-management credential based on a previously stored asset-management credential and transmit the generated data-management credential to the local analytics device 220. Thereafter, the local analytics device 220 may utilize the received data-management credential in line with the above discussion, thereby allowing the local analytics device 220 to then interact with the asset data platform 102 on behalf of the asset 108, provided it has authority to do so.

Figure 8B:
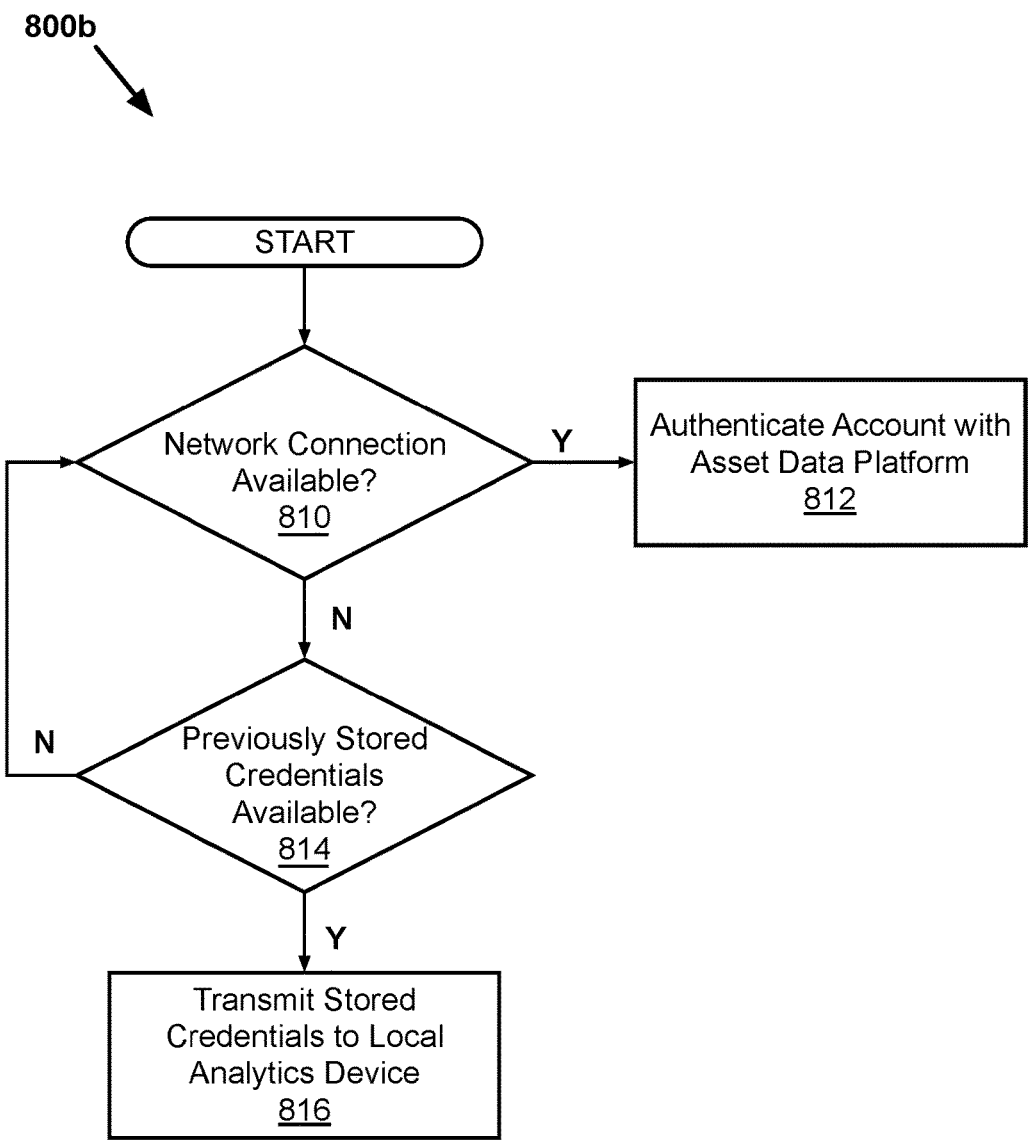
FIG. 8b is a flow diagram that depicts example operations that may occur for determining whether to transmit a credential based on stored information.

FIG. 8b is an example flow diagram 800b that depicts example operations for determining whether a provisioning device 114 will transmit credentials to a local analytics device 220 that are based on previously stored credentials on the provisioning device 114. At block 810, the provisioning device 114 communicatively coupled to the local analytics device 220 may determine whether a network connection is available to the communication network 104 (e.g., whether a communication path exists to the asset data platform 102). If the provisioning device 114 determines that a network connection is available, at block 812, it may act in concert with the asset data platform 102 to authenticate account credentials, as discussed above.

However, if the provisioning device 114 determines that no network connection is available, at block 814, it may determine whether the provisioning device 114 has a suitable asset-management credential (or data-management credential) previously stored in memory. At block 816, based on a credential that was previously stored, the provisioning device 114 may transmit a data-management credential to the local analytics device 220. In the event that the provisioning device 114 includes credentials for multiple accounts, the provisioning device 114 may further determine which credential to exchange, such as the most recently stored credential, among other examples. In the case where no such credential has been previously stored, the provisioning device 114 may continuously or periodically check for a network connection (e.g., block 810) in order to facilitate the provisioning of the local analytics device.

In yet another example, neither the provisioning device 114 nor the local analytics device 220 has connectivity to the asset data platform 102. In practice, either or both of the provisioning device 114 and local analytics device 220 may be configured to determine that no communication path exists with the asset data platform 102 and in response to such determinations, may be further configured to nonetheless perform certain provisioning operations. For example, the local analytics device 220 may transmit to the provisioning device 114 the asset 108's asset signature, and/or the provisioning device 114 may transmit to the local analytics device 220 a data-management credential based on previously stored credentials. The received data may then be stored in the respective local data storage of the devices, and the devices may continue to perform their respective provisioning operations in line with the above discussion.

B. Collection of Operating Data

As mentioned above, each of the representative assets 106 and 108 may take various forms and may be configured to perform a number of operations. In a non-limiting example, the asset 108 may take the form of a locomotive that is operable to transfer cargo across the United States. While in transit, the sensors and/or actuators of the asset 108 may obtain data that reflects one or more operating conditions of the asset 108. The sensors and/or actuators may transmit the data to a processing unit of the asset 108.

The processing unit may be configured to receive the data from the sensors and/or actuators. In practice, the processing unit may receive signal data from multiple sensors and/or multiple actuators simultaneously or sequentially. As discussed above, while receiving this data, the processing unit may also be configured to determine whether the data satisfies triggering criteria that trigger any abnormal-condition indicators, such as fault codes. In the event the processing unit determines that one or more abnormal-condition indicators are triggered, the processing unit may be configured to perform one or more local operations, such as outputting an indication of the triggered indicator via a user interface.

The asset may then transmit operating data to the local analytics device 220 via the asset interface, or the local analytics device 220 may obtain the operating data via the asset interface itself. In turn, the local analytics device 220 may transmit the operating data to the asset data platform 102 via the network interface of local analytics device 220 and the communication network 104. In operation, the local analytics device 220 may transmit operating data to the asset data platform 102 continuously, periodically, and/or in response to triggering events (e.g., abnormal conditions). Specifically, the local analytics device 220 may transmit operating data periodically based on a particular frequency (e.g., daily, hourly, every fifteen minutes, once per minute, once per second, etc.), or the local analytics device 220 may be configured to transmit a continuous, real-time feed of operating data. Additionally or alternatively, the local analytics device 220 may be configured to transmit operating data based on certain triggers, such as when sensor and/or actuator measurements satisfy triggering criteria for any abnormal-condition indicators. The local analytics device 220 may transmit operating data in other manners as well.

In practice, operating data for an asset may include sensor data, actuator data, abnormal-condition data, and/or other asset event data (e.g., data indicating asset shutdowns, restarts, diagnostic operations, fluid inspections, repairs etc.). In some implementations, the local analytics device 220 may be configured to provide the operating data in a single data stream, while in other implementations it may be configured to provide the operating data in multiple, distinct data streams. For example, the local analytics device 220 may provide to the asset data platform 102 a first data stream of signal data and a second data stream of abnormal-condition data. As another example, the local analytics device 220 may provide to the asset data platform 102 a separate data stream for each respective sensor and/or actuator on the asset 108. Other possibilities also exist.

Signal data may take various forms. For example, at times, sensor data (or actuator data) may include measurements obtained by each of the sensors (or actuators) of the asset 108. While at other times, sensor data (or actuator data) may include measurements obtained by a subset of the sensors (or actuators) of the asset 108.

Specifically, the signal data may include measurements obtained by the sensors and/or actuators associated with a given triggered abnormal-condition indicator. For example, if a triggered fault code is Fault Code 1 from FIG. 3, then sensor data may include raw measurements obtained by Sensors A and C. Additionally or alternatively, the data may include measurements obtained by one or more sensors or actuators not directly associated with the triggered fault code. Continuing off the last example, the data may additionally include measurements obtained by Actuator B and/or other sensors or actuators. In some examples, the asset 108 may include particular sensor data in the operating data based on a fault-code rule or instruction provided by the analytics system 108, which may have, for example, determined that there is a correlation between that which Actuator B is measuring and that which caused the Fault Code 1 to be triggered in the first place. Other examples are also possible.

Further still, the data may include one or more sensor and/or actuator measurements from each sensor and/or actuator of interest based on a particular time of interest, which may be selected based on a number of factors. In some examples, the particular time of interest may be based on a sampling rate. In other examples, the particular time of interest may be based on the time at which an abnormal-condition indicator is triggered.

In particular, based on the time at which an abnormal-condition indicator is triggered, the data may include one or more respective sensor and/or actuator measurements from each sensor and/or actuator of interest (e.g., sensors and/or actuators directly and indirectly associated with the triggered indicator). The one or more measurements may be based on a particular number of measurements or particular duration of time around the time of the triggered abnormal-condition indicator.

For example, if a triggered fault code is Fault Code 2 from FIG. 3, the sensors and actuators of interest might include Actuator B and Sensor C. The one or more measurements may include the most recent respective measurements obtained by Actuator B and Sensor C prior to the triggering of the fault code (e.g., triggering measurements) or a respective set of measurements before, after, or about the triggering measurements. For example, a set of five measurements may include the five measurements before or after the triggering measurement (e.g., excluding the triggering measurement), the four measurements before or after the triggering measurement and the triggering measurement, or the two measurements before and the two after as well as the triggering measurement, among other possibilities.

Similar to signal data, the abnormal-condition data may take various forms. In general, the abnormal-condition data may include or take the form of an indicator that is operable to uniquely identify a particular abnormal condition that occurred at the asset 108 from all other abnormal conditions that may occur at the asset 108. The abnormal-condition indicator may take the form of an alphabetic, numeric, or alphanumeric identifier, among other examples. Moreover, the abnormal-condition indicator may take the form of a string of words that is descriptive of the abnormal condition, such as "Overheated Engine" or "Out of Fuel," among other examples.

Asset-related event data may take various forms as well. In example implementations, event data may include an indicator of the type of event that occurred (e.g., a fault code was triggered, diagnostics were run, a fluid anomaly occurred, etc.), a timestamp identifying when the particular event occurred, and/or a duration of time indicating how long the event occurred. Other examples are also possible.

The asset data platform 102, and in particular, the data intake system of the asset data platform 102, may be configured to receive operating data from one or more local analytics devices and/or data sources. The data intake system may be configured to intake at least a portion of the received data, perform one or more operations to the received data, and then relay the data to the data analysis system of the asset data platform 102. In turn, the data analysis system may analyze the received data and based on such analysis, perform one or more operations. As one example, the asset data platform 102 may be configured to define, modify, and/or execute a predictive model (e.g., a predictive model related to the operation of assets, such as an asset failure model) based on such received operating data. These example operations are discussed in U.S. patent application Ser. No. 14/732,258, which is incorporated herein by reference in its entirety.

V. Example Methods

Figure 9:
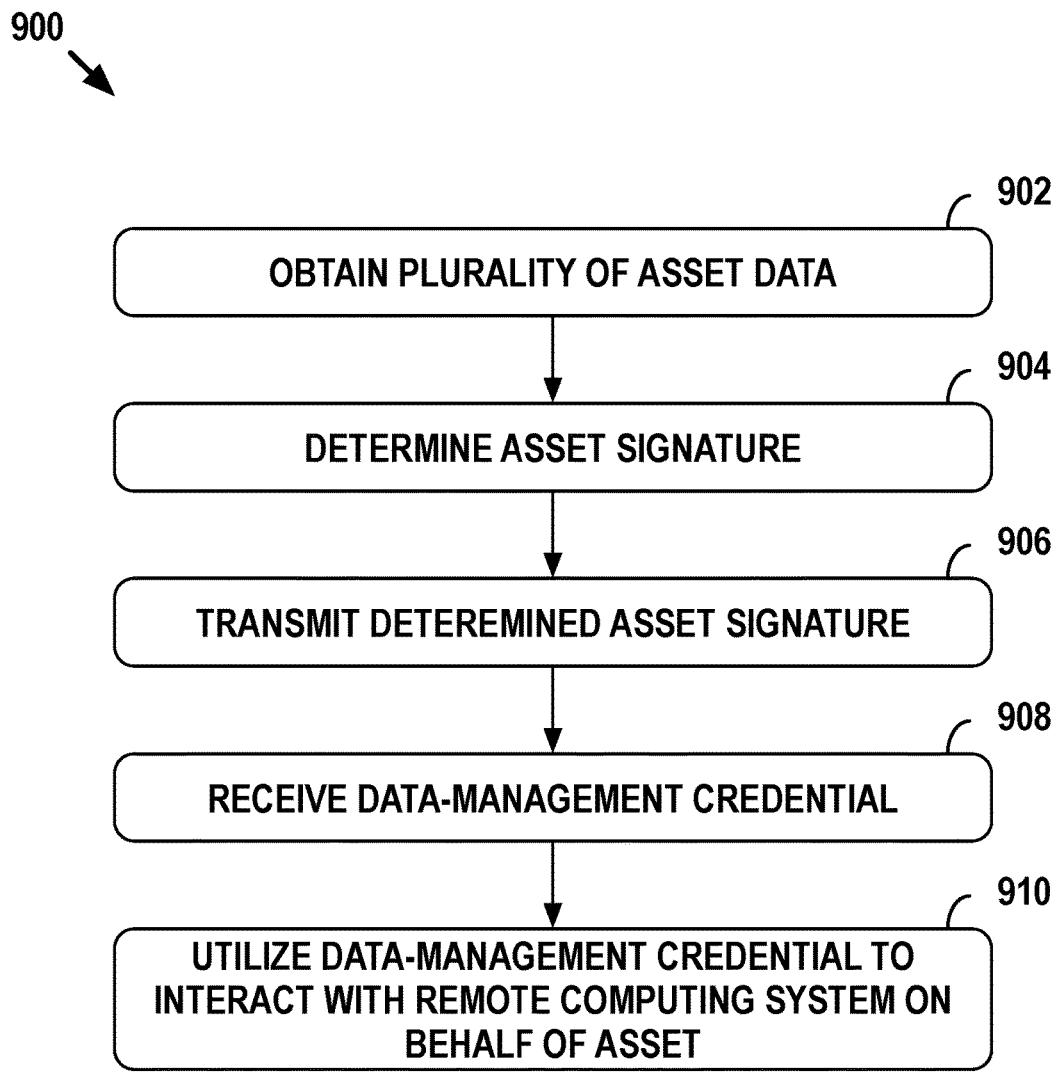
FIG. 9 depicts a flow diagram of an example method for provisioning a local analytics device that may be performed by a local analytics device.

Turning now to FIG. 9, a flow diagram is depicted illustrating an example method 900 for provisioning a local analytics device to interact with an asset data platform on behalf of an asset that may be performed by the local analytics device 220. For the method 900 and the other methods discussed below, the operations illustrated by the blocks in the flow diagrams may be performed in line with the above discussion. Moreover, one or more operations discussed above may be added to a given flow diagram.

At block 902, the method 900 may involve the local analytics device 220 obtaining, via an asset interface of the local analytics device, a plurality of asset data, where each asset data is indicative of a configuration parameter of the asset. At block 904, the method 900 may involve the local analytics device 220, based on the plurality of asset data, determining an asset signature for the asset. At block 906, the method 900 may involve the local analytics device 220, transmitting, via a network interface of the local analytics device, to a computing device executing an application for provisioning the local analytics device (e.g., the provisioning device 114), the determined asset signature. At block 908, the method 900 may involve the local analytics device 220, in response to transmitting the determined asset signature, receiving, via the network interface, a data-management credential for enabling the local analytics device to perform one or more operations on behalf of the asset. At block 910, the method 900 may involve the local analytics device 220 utilizing the data-management credential to interact with the remote computing system (e.g., the asset data platform 102) on behalf of the asset.

Figure 10:
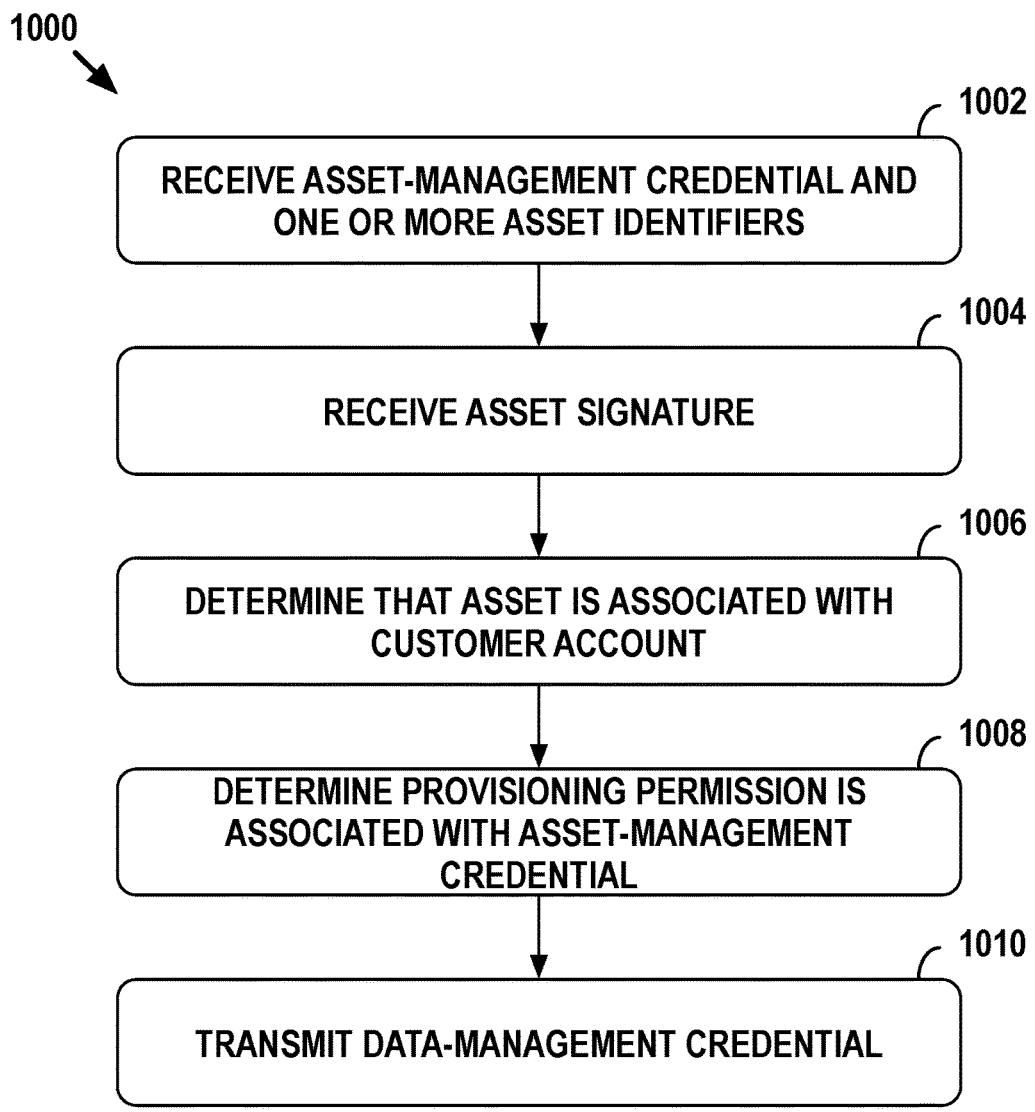
FIG. 10 depicts a flow diagram of an example method for provisioning a local analytics device that may be performed by a provisioning device.

FIG. 10 depicts a flow diagram of an example method 1000 for provisioning a local analytics to interact with an asset data platform on behalf of an asset that may be performed by the provisioning device 114. At block 1002, the method 1000 may involve the provisioning device 114, in response to transmitting an account credential to the remote computing system (e.g., the asset data platform 102), receiving from the remote computing system an asset-management credential and one or more asset identifiers, wherein each asset identifier corresponds to a given asset associated with a customer account. At block 1004, the method 1000 may involve the provisioning device 114 receiving from the local analytics device an asset signature, where the asset signature is indicative of a configuration of the asset. At block 1006, the method 1000 may involve the provisioning device 114, based on the one or more asset identifiers and the asset signature, determining that the asset is associated with the customer account. At block 1008, the method 1000 may involve the provisioning device 114 determining that a provisioning permission is associated with the asset-management credential. At block 1010, the method 1000 may involve the provisioning device 114, based on (1) determining that the asset is associated with the customer account and (2) determining that the provisioning permission is associated with the asset-management credential, transmitting to the local analytics device a data-management credential for enabling the local analytics device to perform one or more operations on behalf of the asset.

Figure 11:
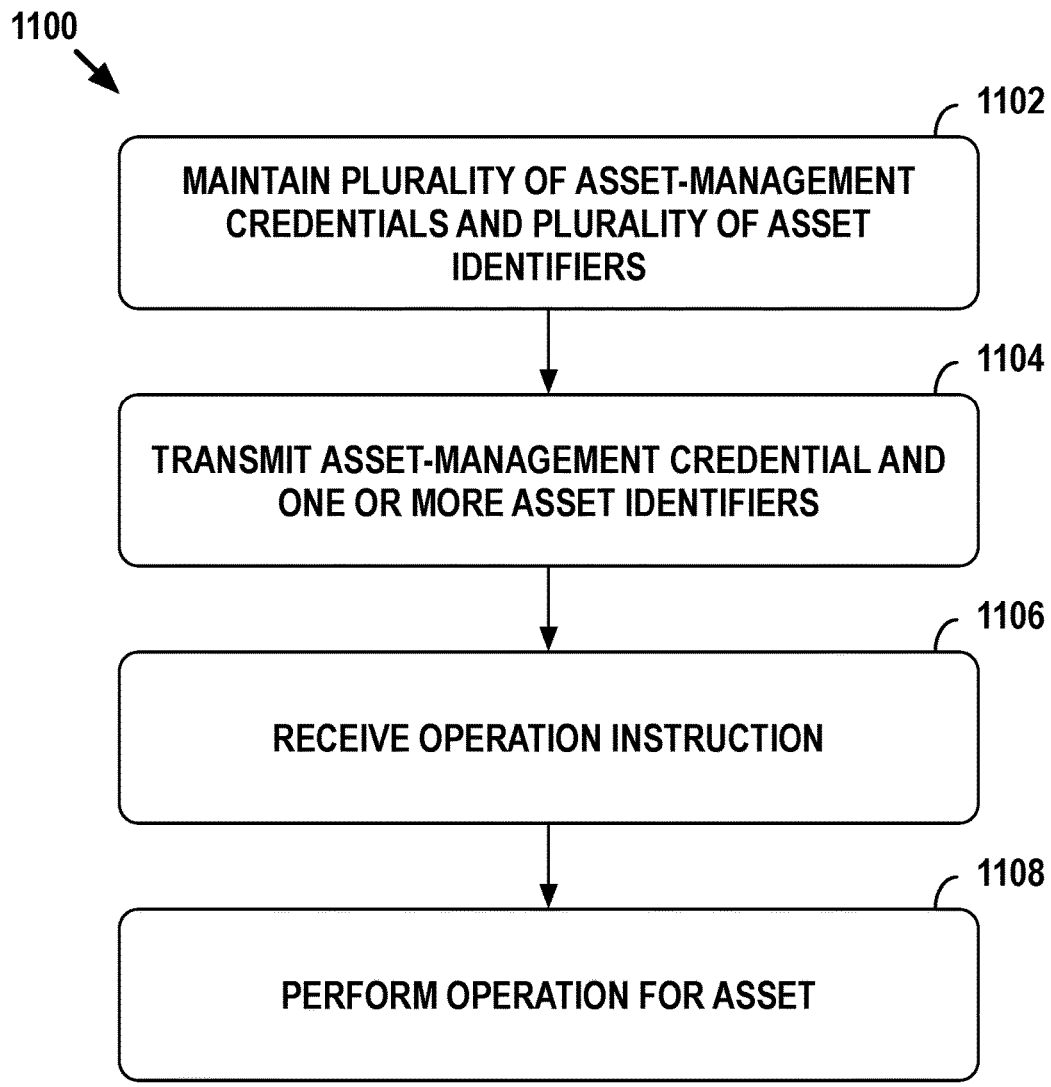
FIG. 11 depicts a flow diagram of an example method for provisioning a local analytics device that may be performed by an asset data platform.

FIG. 11 depicts a flow diagram of an example method 1100 for provisioning a local analytics device to interact with an asset data platform on behalf of an asset that may be performed by the asset data platform 102. At block 1102, the method 1100 may involve the asset data platform 102 maintaining a plurality of asset-management credentials and a plurality of asset identifiers, where each asset identifier corresponds to a given asset associated with a customer account. At block 1104, the method 1100 may involve the asset data platform 102, based on an account credential received from the provisioning device 114 an account credentials, transmitting to the provisioning device 114 an asset-management credential and one or more asset identifiers. At block 1106, the method 1100 may involve the asset data platform 102 receiving from the local analytics device an operation instruction comprising a data-management credential that is based on the asset-management credential. At block 1108, the method 1100 may involve the asset data platform 102 performing an operation for the asset in response to receiving the data-management credential from the local analytics device.

VI. CONCLUSION

Example embodiments of the disclosed innovations have been described above. Those skilled in the art will understand, however, that changes and modifications may be made to the embodiments described without departing from the true scope and sprit of the present invention, which will be defined by the claims.

Further, to the extent that examples described herein involve operations performed or initiated by actors, such as "humans", "operators", "users" or other entities, this is for purposes of example and explanation only. The claims should not be construed as requiring action by such actors unless explicitly recited in the claim language.

The invention claimed is:

1. A computing device configured to facilitate provisioning a local analytics device to interact with a remote computing system on behalf of an asset coupled to the local analytics device, the computing device comprising:
    at least one wireless network interface configured to (1) communicatively couple the computing device to the remote computing system via a first communication path that includes a wide-area network and (2) communicatively couple the computing device to the local analytics device via a second communication path, wherein the local analytics device is coupled to one or more on-board systems of the asset;
    at least one processor;
    a non-transitory computer-readable medium; and
    program instructions stored on the non-transitory computer-readable medium that are executable by the at least one processor to cause the computing device to:
        in response to transmitting an account credential to the remote computing system, receive, from the remote computing system via the at least one wireless network interface, an asset-management credential and one or more asset identifiers, wherein each asset identifier corresponds to a given asset associated with a customer account;
        receive, from the local analytics device via the at least one wireless network interface, an asset signature, wherein the asset signature is indicative of a configuration of the asset;
        based on the one or more asset identifiers and the asset signature, determine that the asset is associated with the customer account;
        determine that a provisioning permission is associated with the asset-management credential;
        based on (1) determining that the asset is associated with the customer account and (2) determining that the provisioning permission is associated with the asset-management credential, transmit, to the local analytics device via the at least one wireless network interface, a data-management credential for enabling the local analytics device to perform one or more operations on behalf of the asset.

2. The computing device of claim 1, wherein the computing device further comprises program instructions stored on the non-transitory computer-readable medium that are executable by the at least one processor to cause the computing device to:
    after receiving the asset signature, define a local asset identifier representative of the asset signature; and
    transmit, to the remote computing system via the at least one wireless network interface, at least the local asset identifier, wherein the one or more asset identifiers comprise the local asset identifier.

3. The computing device of claim 2, wherein determining that the asset is associated with the customer account is further based on the local asset identifier.

4. The computing device of claim 1, wherein determining that the asset is associated with the customer account comprises:
    based on determining that the asset signature does not correspond to any of the one or more asset identifiers, determining whether a network connection exists between the computing device and the remote computing system.

5. The computing device of claim 4, wherein determining that the asset is associated with the customer account comprises:
- if the network connection does not exist, obtaining asset identification information based on one or more inputs via the computing device; and
- otherwise, transmitting, to the remote computing system via the at least one wireless network interface, at least a portion of the asset signature and in response, receiving, from the remote computing system via the at least one wireless network interface, an additional asset identifier corresponding to the asset signature.

6. The computing device of claim 5, wherein obtaining the asset identification information comprises:
- capturing an image comprising the asset identification information; and
- extracting from the image the asset identification information.

7. A non-transitory computer-readable medium having instructions stored thereon that are executable to cause a computing device configured to facilitate provisioning a local analytics device to interact with a remote computing system on behalf of an asset coupled to the local analytics device, wherein the computing device comprises at least one wireless network interface configured to (1) communicatively couple the computing device to the remote computing system via a first communication path that includes a wide-area network and (2) communicatively couple the computing device to the local analytics device via a second communication path, wherein the local analytics device is coupled to one or more on-board systems of the asset, and wherein the instructions are executable to cause the computing device to:
- in response to transmitting an account credential to the remote computing system, receive, from the remote computing system via the at least one wireless network interface of the computing device, an asset-management credential and one or more asset identifiers, wherein each asset identifier corresponds to a given asset associated with a customer account;
- receive, from the local analytics device via the at least one wireless network interface of the computing device, an asset signature, wherein the asset signature is indicative of a configuration of the asset;
- based on the one or more asset identifiers and the asset signature, determine that the asset is associated with the customer account;
- determine that a provisioning permission is associated with the asset-management credential;
- based on (1) determining that the asset is associated with the customer account and (2) determining that the provisioning permission is associated with the asset-management credential, transmit, to the local analytics device via the at least one wireless network interface of the computing device, a data-management credential for enabling the local analytics device to perform one or more operations on behalf of the asset.

8. The non-transitory computer-readable medium of claim 7, wherein the instructions are further executable to cause the computing device to:
- after receiving the asset signature, define a local asset identifier representative of the asset signature; and
- transmit, to the remote computing system via the at least one wireless network interface of the computing device, at least the local asset identifier, wherein the one or more asset identifiers comprise the local asset identifier.

9. The non-transitory computer-readable medium of claim 8, wherein determining that the asset is associated with the customer account is further based on the local asset identifier.

10. The non-transitory computer-readable medium of claim 7, wherein determining that the asset is associated with the customer account comprises:
- based on determining that the asset signature does not correspond to any of the one or more asset identifiers, determining whether a network connection exists between the computing device and the remote computing system.

11. The non-transitory computer-readable medium of claim 10, wherein determining that the asset is associated with the customer account comprises:
- if the network connection does not exist, obtaining asset identification information based on one or more inputs via the computing device; and
- otherwise, transmitting, to the remote computing system via the at least one wireless network interface of the computing device, at least a portion of the asset signature and in response, receiving, from the remote computing system via the at least one wireless network interface of the computing device, an additional asset identifier corresponding to the asset signature.

12. The non-transitory computer-readable medium of claim 11, wherein obtaining the asset identification information comprises:
- capturing an image comprising the asset identification information; and
- extracting from the image the asset identification information.

13. An asset-condition monitoring system comprising:
- a remote computing system configured to remotely monitor operating conditions of at least one asset;
- a computing device comprising at least one wireless network interface that is configured to (1) communicatively couple the computing device to the remote computing system via a first communication path that includes wide-area network and (2) communicatively couple the computing device to a local analytics device via a second communication path, wherein the local analytics device is coupled to one or more on-board systems of a given asset, and wherein the computing device is configured to facilitate provisioning the local analytics device to interact with the remote computing system on behalf of the given asset that is coupled to the local analytics device; and
- wherein the remote computing system is configured to:
  - maintain a plurality of asset-management credentials and a plurality of asset identifiers, wherein each respective asset identifier corresponds to a respective asset associated with a customer account;
  - based on an account credential, transmit to the computing device an asset-management credential and one or more asset identifiers; and
  - perform an operation for the given asset in response to receiving a data-management credential from the local analytics device; and
- wherein the computing device is configured to:
  - receive, from the remote computing system via the at least one wireless network interface of the computing device, the asset-management credential and the one or more asset identifiers;
  - receive, from the local analytics device via the at least one wireless network interface of the computing device, an asset signature, wherein the asset signature is indicative of a configuration of the given asset;

based on the one or more asset identifiers and the asset signature, determine that the given asset is associated with the customer account; and based on (1) determining that the given asset is associated with the customer account and (2) determining that a provisioning permission is associated with the asset-management credential, transmit, to the local analytics device via the at least one wireless network interface of the computing device, a data-management credential for enabling the local analytics device to perform one or more operations on behalf of the given asset.

14. The asset-condition monitoring system of claim 13, wherein maintaining the plurality of asset identifiers comprises, for a respective asset identifier, associating the respective asset identifier with a respective asset signature that is indicative of a configuration of the respective asset.

15. The asset-condition monitoring system of claim 14, wherein maintaining the plurality of asset identifiers comprises, for a respective asset signature, modifying the respective asset signature based on receiving data indicative of a change to a particular configuration parameter of the respective asset.

16. The asset-condition monitoring system of claim 14, wherein the computing device is further configured to, after receiving the asset signature, define a local asset identifier representative of the asset signature, and wherein maintaining the plurality of asset identifiers comprises:

defining an asset identifier based on receiving the local asset identifier; and associating the defined asset identifier with the asset signature.

17. The asset-condition monitoring system of claim 13, wherein performing the operation for the given asset comprises:

executing at least one predictive model related to the operation of the given asset based on signal data received from the local analytics device; and transmitting, to the local analytics device via the at least one wireless network interface of the computing device, one or more results of the executing.

18. The asset-condition monitoring system of claim 13, wherein determining that the given asset is associated with the customer account comprises:

based on determining that the asset signature does not correspond to any of the one or more asset identifiers, determining whether a network connection exists between the computing device and the remote computing system.

19. The asset-condition monitoring system of claim 18, wherein determining that the given asset is associated with the customer account comprises:

if the network connection does not exist, obtaining asset identification information based on one or more inputs via the computing device; and otherwise, transmitting, the remote computing system via the at least one wireless network interface of the computing device, at least a portion of the asset signature and in response, receiving, from the remote computing system via the at least one wireless network interface of the computing device, an additional asset identifier corresponding to the asset signature.

20. The asset-condition monitoring system of claim 13, wherein the asset signature comprises a plurality of asset data compiled in a particular sequence.

* * * * *